(12) United States Patent
Pekelny et al.

(10) Patent No.: US 10,445,942 B1
(45) Date of Patent: Oct. 15, 2019

(54) RANKING OF HOLOGRAM PLACEMENT LOCATIONS BASED ON UNEXPOSED INFORMATION

(71) Applicant: MICROSOFT TECHNOLOGY LICENSING, LLC, Redmond, WA (US)

(72) Inventors: Yuri Pekelny, Redmond, WA (US); Andrey Konin, Seattle, WA (US); Michael Bleyer, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/023,184

(22) Filed: Jun. 29, 2018

(51) Int. Cl.
*G06T 19/00* (2011.01)
*G02B 27/01* (2006.01)
*G06F 16/51* (2019.01)

(52) U.S. Cl.
CPC ........ *G06T 19/006* (2013.01); *G02B 27/0172* (2013.01); *G06F 16/51* (2019.01); *G02B 2027/014* (2013.01); *G02B 2027/0174* (2013.01)

(58) Field of Classification Search
CPC ... G06T 19/006; G06F 16/51; G02B 27/0172; G02B 2027/014; G02B 2027/0174
USPC ........................................... 345/419
See application file for complete search history.

(56) References Cited

U.S. PATENT DOCUMENTS

2019/0026936 A1* 1/2019 Gorur Sheshagiri ..... G06T 7/70

* cited by examiner

*Primary Examiner* — King Y Poon
*Assistant Examiner* — Vincent Peren
(74) *Attorney, Agent, or Firm* — Workman Nydegger

(57) ABSTRACT

Techniques are provided to rank a set of candidate hologram placement locations based on a defined set of rules or criteria. An environment's spatial mapping is initially accessed. This spatial mapping describes the environment in a 3D representation. By analyzing this spatial mapping, an unordered set of candidate hologram placement locations is generated. These candidate hologram placement locations are locations that are identified from within the environment as being locations that are potentially suitable for hosting a hologram. To be selected, each of the candidate hologram placement locations is required to satisfy certain minimum criteria. Thereafter, these candidate hologram placement locations are then ranked based on a set of pre-defined hologram placement criteria to generate a set of ranked candidate hologram placement locations. This set of ranked candidate hologram placement locations is then exposed by causing the set to be accessible during a hologram placement event.

20 Claims, 19 Drawing Sheets

RANKING OF HOLOGRAM PLACEMENT LOCATIONS BASED ON UNEXPOSED INFORMATION

BACKGROUND

Mixed-reality systems, including virtual-reality (VR) and augmented-reality (AR) systems, have received significant attention because of their ability to create truly unique experiences for their users. For reference, conventional VR systems create a completely immersive experience by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting holograms that are placed in or that interact with the real world.

As used herein, VR and AR systems are described and referenced interchangeably. Unless stated otherwise, the descriptions herein apply equally to all types of mixed-reality systems, which (as detailed above) include AR systems, VR systems, and/or any other similar system capable of displaying holograms.

Some of the disclosed mixed-reality systems use one or more on-body devices (e.g., the HMD, a handheld device, etc.). The HMD provides a display that enables a user to view overlapping and/or integrated visual information (e.g., holograms) in whatever environment the user is in, be it a VR environment, an AR environment, or any other type of environment. Continued advances in hardware capabilities and rendering technologies have greatly improved how mixed-reality systems render holograms. Notwithstanding those advances, the process of immersing a user into a mixed-reality environment creates many challenges, difficulties, and costs, particularly with regard to providing a high quality hologram or holographic image to the user.

When working with a mixed-reality device, one of the goals is to place a virtual object (also called "hologram") into the environment (either a simulated environment or the real world) in a manner so that the hologram or the interaction with the hologram is as realistic as possible. By increasing the realism of the hologram itself or the realism of the interaction with the hologram, the user's experience will be dramatically increased. To increase the realism, the hologram should be located at a suitable location. As an example case, if the hologram is representative of a large dragon, it is probably not appropriate to place the large dragon hologram underneath a small coffee table because the coffee table will cut off portions of the dragon and will lead to an unrealistic scene. Furthermore, it is probably not appropriate to place the hologram so close to a wall that a portion of the dragon's body is cut off by the wall. Such occurrences negatively impact the visual effects of the hologram and thereby hinder the user's experience. Accordingly, there is a need to improve how holograms are placed in a mixed-reality environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments are directed to systems and methods for automatically characterizing or ranking a set of potential hologram placement locations based on a pre-defined set of rules and/or criteria.

Initially, a spatial mapping of an environment is obtained or otherwise accessed. This spatial mapping includes descriptive information about the environment, where the descriptive information at least describes the environment in a three-dimensional (3D) representation. By analyzing this spatial mapping, an unordered set of candidate hologram placement locations is generated. These candidate hologram placement locations are locations that are extracted, or rather identified, from within the environment as being locations that are suitable for hosting a hologram or other type of virtual image. In order to be selected, each of the candidate hologram placement locations is required to satisfy certain minimum criteria that are used to determine whether each location is actually acceptable/suitable to host a hologram. Thereafter, these candidate hologram placement locations are then ranked using a set of pre-defined hologram placement ranking criteria. As a result of this ranking process, a set of ranked candidate hologram placement locations is then generated. Subsequently, this set of ranked candidate hologram placement locations is then exposed by causing the set to be accessible at least during a hologram placement event.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
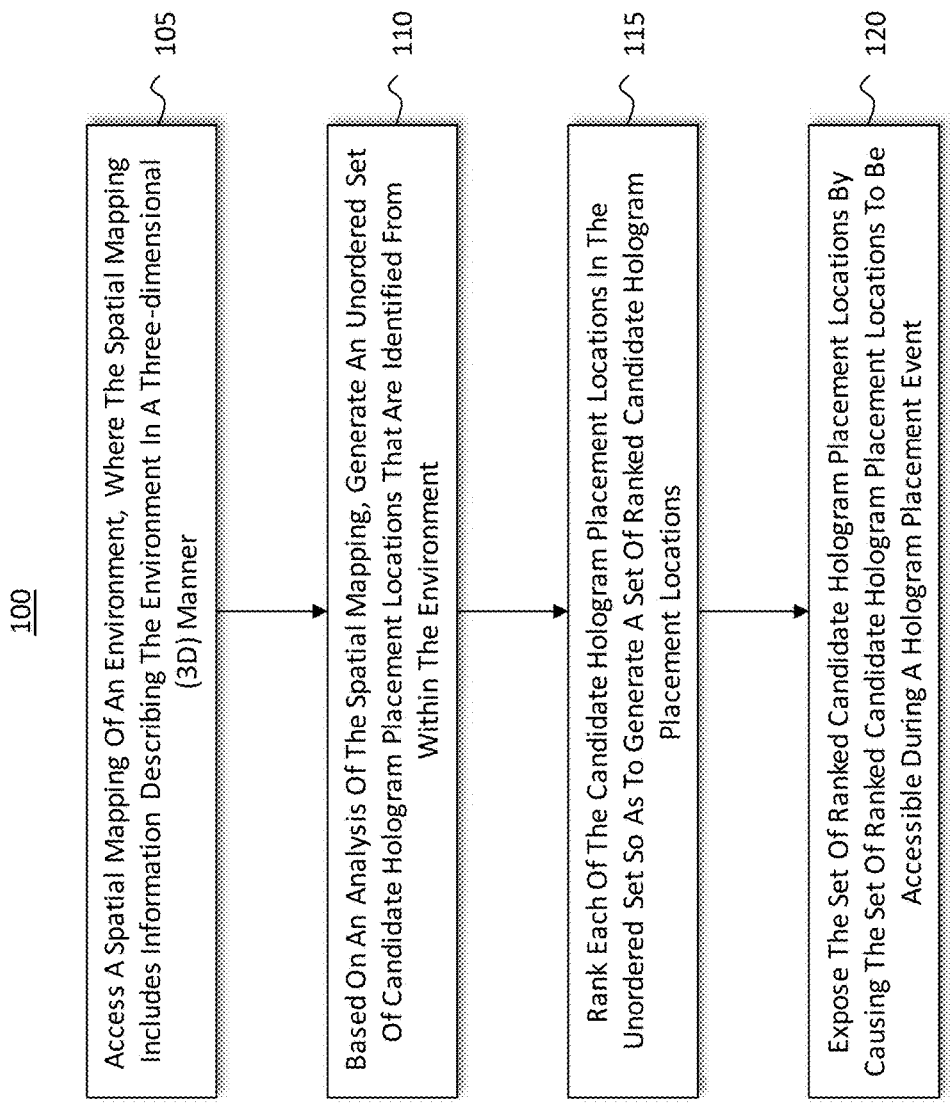
FIG. 1 illustrates a flowchart of an example method for identifying and ranking candidate hologram placement locations using a set of pre-defined criteria.

The disclosed embodiments are directed to systems and methods for automatically ranking a set of potential hologram placement locations based on a pre-defined set of rules and/or criteria, which criteria may be kept private or otherwise might not be exposed to a developer. An environment's spatial mapping is first accessed. This spatial mapping describes the environment in a 3D representation. By analyzing this spatial mapping, an unordered set of candidate hologram placement locations is generated. These candidate hologram placement locations are locations that are identified (from within the environment) as being locations that are adequately suitable for hosting one or more holograms. To be considered during the selection process, each of the candidate hologram placement locations is required to satisfy certain minimum "placement" criteria, which are used to gauge a location's suitability for hosting holograms. Thereafter, these candidate hologram placement locations are ranked, ordered, arranged, or otherwise structured using a set of pre-defined hologram placement criteria to generate a set of ranked candidate hologram placement locations. Subsequently, this set of ranked candidate hologram placement locations is then exposed by causing the set to be accessible at least during a hologram placement event.

As described earlier, it is often desirable to place holograms in an environment for a user to view or otherwise interact with. As used herein, any reference to an "environment" should be understood to include virtual-reality environments (where only virtual content is presented to a user) or augmented-reality environments (where virtual content is overlaid or projected within a real-world environment). Collectively, these two types of environments may be referred to as "mixed-reality environments" or simply "environments."

The process of selecting where a hologram will be located (at least initially as well as subsequently if the hologram is capable of movement) and where that hologram is allowed to move is a carefully engineered process that requires precision and a robust understanding of the hologram's environment. As such, the disclosed embodiments have been designed to solve problems in the traditional technology regarding how and where a hologram is to be placed or located. In fact, significant advantages are realized by practicing the disclose embodiments. These advantages include, but are not limited to, providing a platform/hardware agnostic hologram placement solution such that any hardware configuration or operating system (OS) may be used when selecting or determining a hologram's placement location within an environment.

By providing a platform agnostic solution, the disclosed principles are highly portable and may be practiced by any type of computing device or operating system. Additional advantages include exposing a set of high-level, or rather "abstracted," criteria to a developer or computing system as opposed to exposing all or some of the underlying detailed information, which may change between different hardware configurations or which may be private/confidential. Alternatively, only the resulting ranked set of candidate hologram placement locations may be exposed to the developer or computer system such that the ranking criteria might be kept confidential.

Some additional advantages are listed below. For example, some mixed-reality systems perform (or obtain) spatial mapping of a surrounding environment and provide application programming interfaces (APIs) for finding locations suitable for hologram placement. In some instances, these APIs provide a list of 2D rectangles or 3D cuboids inside a 3D space using a relative transform between a camera on the user's HMD and the 2D rectangle or voxel. A developer may decide which 2D rectangle or voxel to use for hologram placement based on the rectangle/voxel's size, relative distance, and/or orientation. Though orientation and dimensions of the rectangle or voxel are valuable information, other information is available to the internal algorithm but may not be exposed through the APIs. Internal information is not exposed, in many situations, for example, to prevent external dependencies on a specific hardware platform and/or a specific algorithm implementation and to reduce the amount of data transferred between different subsystems.

Figure 18:
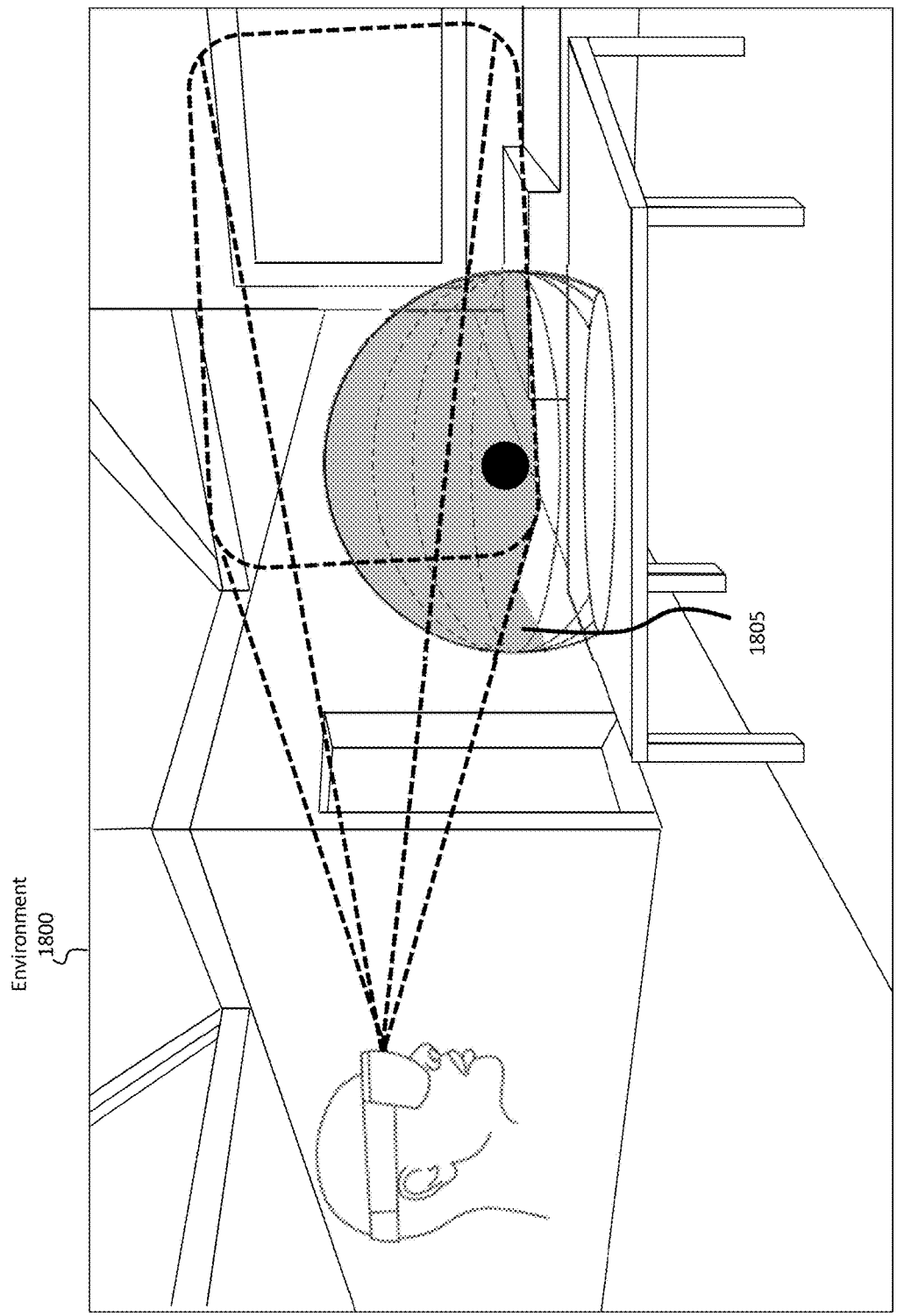
FIG. 18 shows how, at a different point in time, another part of the virtual sphere is overlapped by the HMD's field of view while still tracking the overall total amount of overlap.
Figure 19:
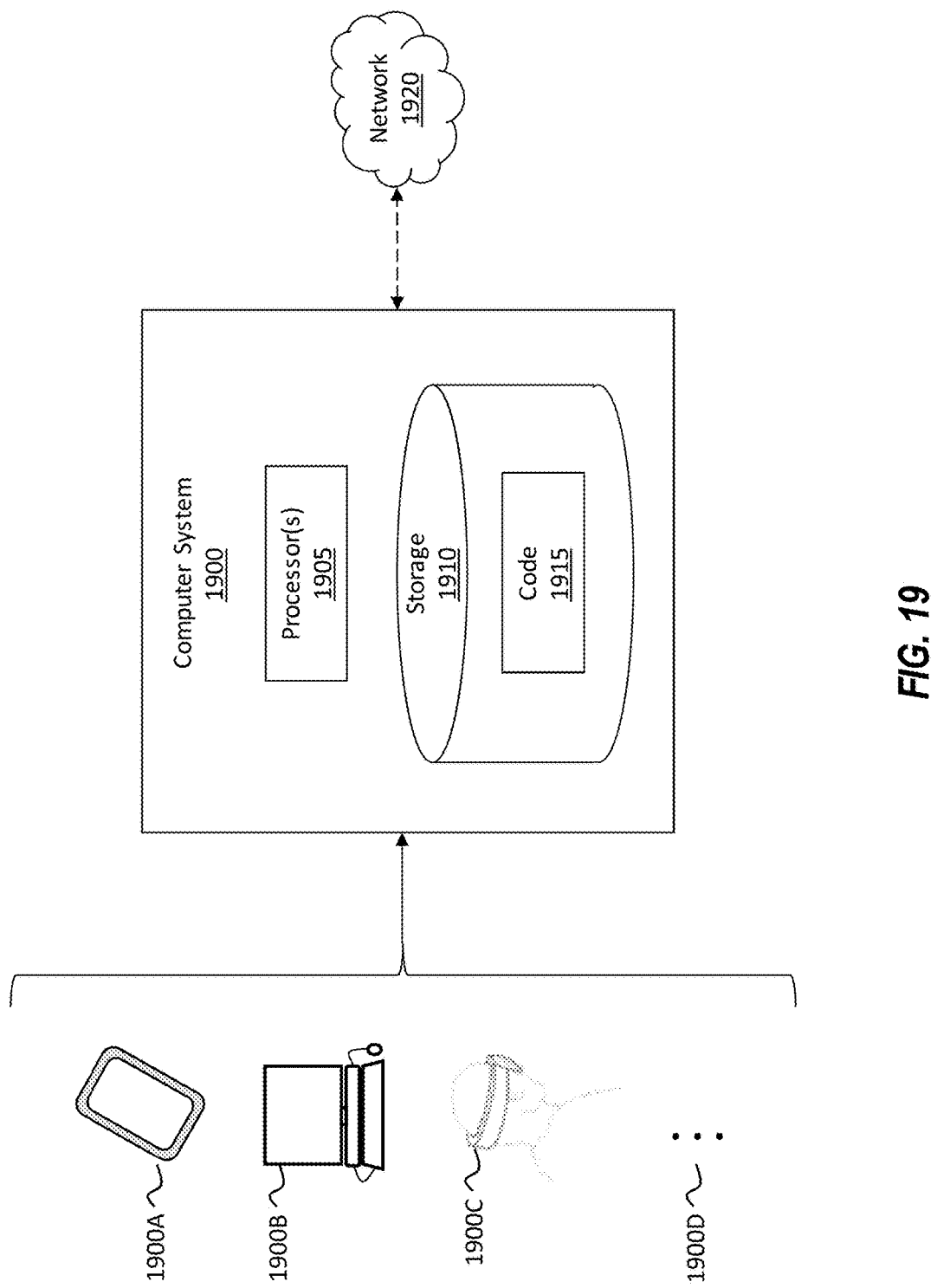
FIG. 19 illustrates an example computer system capable of performing the disclosed operations.

Attention will now be directed to the Figures, which will be discussed in order. FIG. 1 outlines a flowchart of an example method for identifying, categorizing, and/or ranking candidate hologram placement locations based on a set of pre-defined criteria. FIGS. 2A through 5 illustrate various scenarios regarding how a spatial mapping may be generated, accessed, and/or used. Next, FIGS. 6 through 18 illustrate various architectures, criteria, and other supporting illustrations regarding how the embodiments identify and rank candidate hologram placement locations. Finally, FIG. 19 illustrates an example computer system capable of performing any of the disclosed operations.

Example Methods For Ranking/Prioritizing Candidate Hologram Placement Locations

The following discussion refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 1 illustrates a flowchart 100 of an example method for ranking candidate hologram placement locations based on a set of pre-defined criteria or rules. As illustrated, the first act of the flowchart 100 comprises an act of accessing a spatial mapping of an environment (act 105). This spatial mapping includes information describing the environment in a three-dimensional (3D) representation. For example, the spatial mapping may include a depth map, a 3D dot/point cloud, a 3D mesh, or any other data capable of representing or describing an environment.

Based on an analysis of this spatial mapping, an unordered set of one or more candidate hologram placement locations is then generated (act 110). By way of clarification, each of these candidate hologram placement locations is identified from within the environment as being a potential location for hosting or placing a hologram. In this regard, each one of the candidate hologram placement locations identifies or is associated with a corresponding actual or physical location in the environment. Furthermore, in some implementations, each one of the candidate hologram placement locations may be selected for inclusion in the unordered set as a result of each one satisfying certain minimum criteria that are used to determine whether each one's corresponding physical location is suitable for hosting a hologram. These initial minimum criteria will be discussed in further detail below.

Subsequently, each one of the candidate hologram placement locations in the unordered set is then ranked against the other ones (act 115). This ranking process results in the creation of a set of ranked candidate hologram placement locations. This ranking may be based on a set of pre-defined hologram placement criteria, as will be described below.

After the set of ranked candidate hologram placement locations are ranked, they are exposed (act 120). This exposure process may be performed by causing the set of ranked candidate hologram placement locations to be accessible during a hologram placement event, or even during a hologram generation event where the hologram is being formed/created. A human developer can then use the ranked list when deciding where to actually place a particular hologram, or even use the ranked list in deciding the dimensions or other features of the hologram while it is being created. Additionally, in some cases, anticipated attributes of a future hologram or actual attributes of an existing hologram (which is not yet placed in the environment) may influence how the candidate hologram placement locations are ranked. In yet other embodiments, the ranked list is used by a computer system to automatically generate and/or place holograms in an environment based on the ranked list.

It will also be appreciated that the resulting placement location rankings can be exposed either as an additional field within existing placement location data provided by a particular API or, alternatively, as additional data provided by any number of additional APIs, on an on-demand basis. Additionally, the placement location ranking can be exposed using concrete reference units (e.g. "age" can be expressed in seconds, minutes, hours, etc.) or as a unitless reference (e.g. a normalized value between 0 and 100) or as relative level, tier or grade (e.g., high, medium, low, "A," "B," "C," etc.). By ranking the placement locations for the holograms, it is possible to further assist a developer and/or an autonomous computer system to determine where holograms are to be placed.

Operations Using A Spatial Mapping

As used herein, a "spatial mapping" refers to a digital representation or construct of an environment. A spatial mapping may include, but is not limited to, any number of depth maps, 3D dot/point clouds, and/or a 3D mesh comprised of polygons (e.g., triangles). A triangular 3D mesh is comprised of many different triangles, where the collective combination of these triangles accurately represents the various features of all or some geometric surfaces in the environment. A 3D mesh may be generated for only a single object or for an entire environment or region. When the 3D mesh is of an entire region, then it can be thought of as a compilation of holograms or holographic information that describes "objects" as well as the different geometric surfaces of those objects (e.g., the walls, doors, tables, windows, etc.).

Other information may be included in the spatial mapping as well. For instance, some of the information that describes the environment in the 3D representation and that is included in the spatial mapping may include planar information for any geometric planes in the environment. Additionally, or alternatively, some of the information may include volumetric information for any cubic areas in the environment.

Figure 2B:
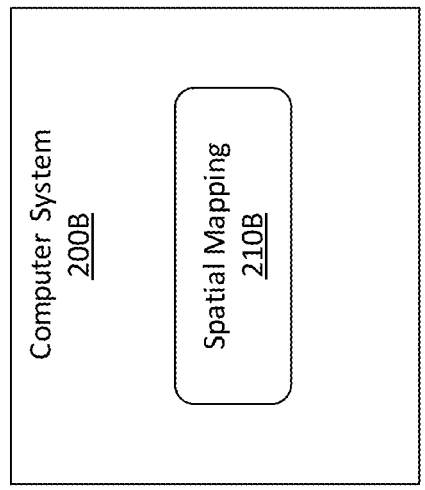
FIGS. 2A and 2B illustrate how a spatial mapping can be accessed from a cloud environment or, alternatively, from a local computer system.
Figure 2A:
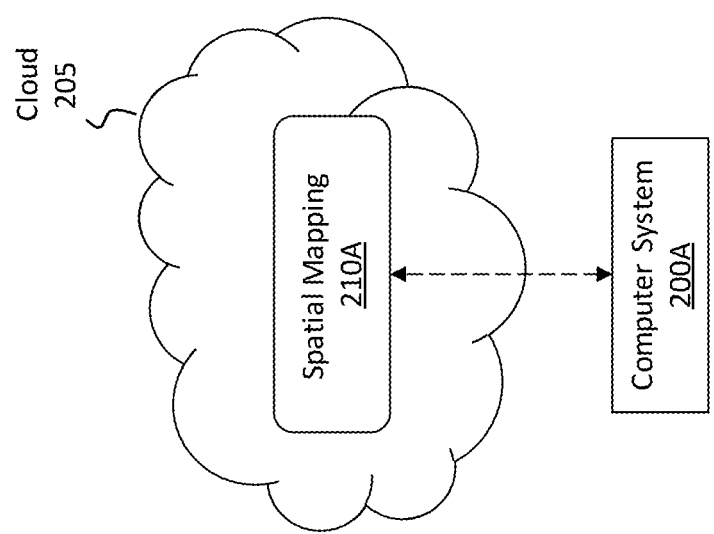

It will be appreciated that the spatial mapping can be stored in a cloud environment or on a local device. Combinations of the above are also available. FIG. 2A shows a computer system 200A that is able to communicate with a cloud environment 205 to access a spatial mapping 210A. In this situation, the spatial mapping 210A was previously generated by the computer system 200A or by an entirely separate system, and the computer system 200A is simply obtaining access to that spatial mapping 210A over a network connection between itself and the cloud environment 205.

In other scenarios, however, a computer system can be used to actually generate a spatial mapping and then store that spatial mapping locally or remotely. For instance, FIG. 2B shows an example computer system 200B capable of locally generating and storing a spatial mapping 210B. Of course, it will be appreciated that the computer system 200B, after generating the spatial mapping 210B, is able to upload or otherwise store the spatial mapping 210B in a cloud environment. Accordingly, the spatial mapping of the environment may be stored in a cloud environment, or, alternatively, the spatial mapping may be generated by a computer system that scans the environment and then stores the spatial mapping on the computer system such that the spatial mapping is accessed locally.

Figure 3:
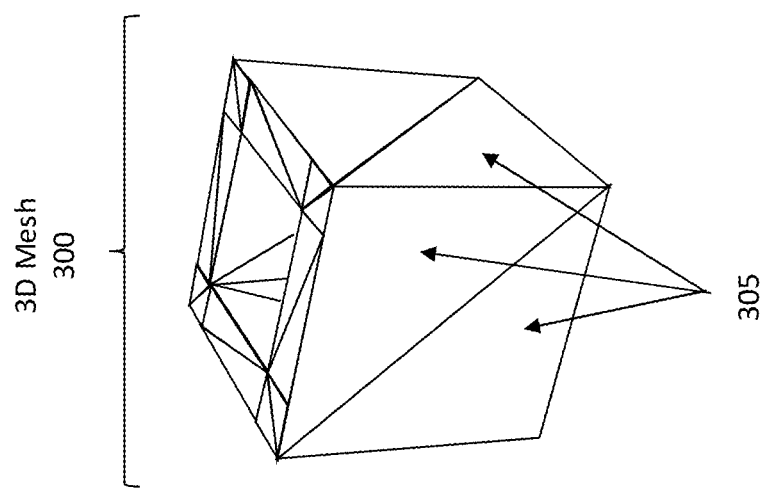
FIG. 3 illustrates an example implementation of a spatial mapping in the form of a 3D mesh.

FIG. 3 shows one example implementation of a spatial mapping (e.g., the spatial mapping 210A or 210B from FIGS. 2A and 2B, respectively). In FIG. 3, the spatial mapping is in the form of a 3D mesh 300. As described earlier, 3D mesh 300 is comprised of any number of triangles 305 (or other polygons), which are organized in a manner so as to describe the contours and boundaries of an object. While FIG. 3 shows a 3D mesh describing a cubic object, it will be appreciated that a 3D mesh may also be used to describe an entire environment and any objects or fixtures within that environment.

Figure 4:
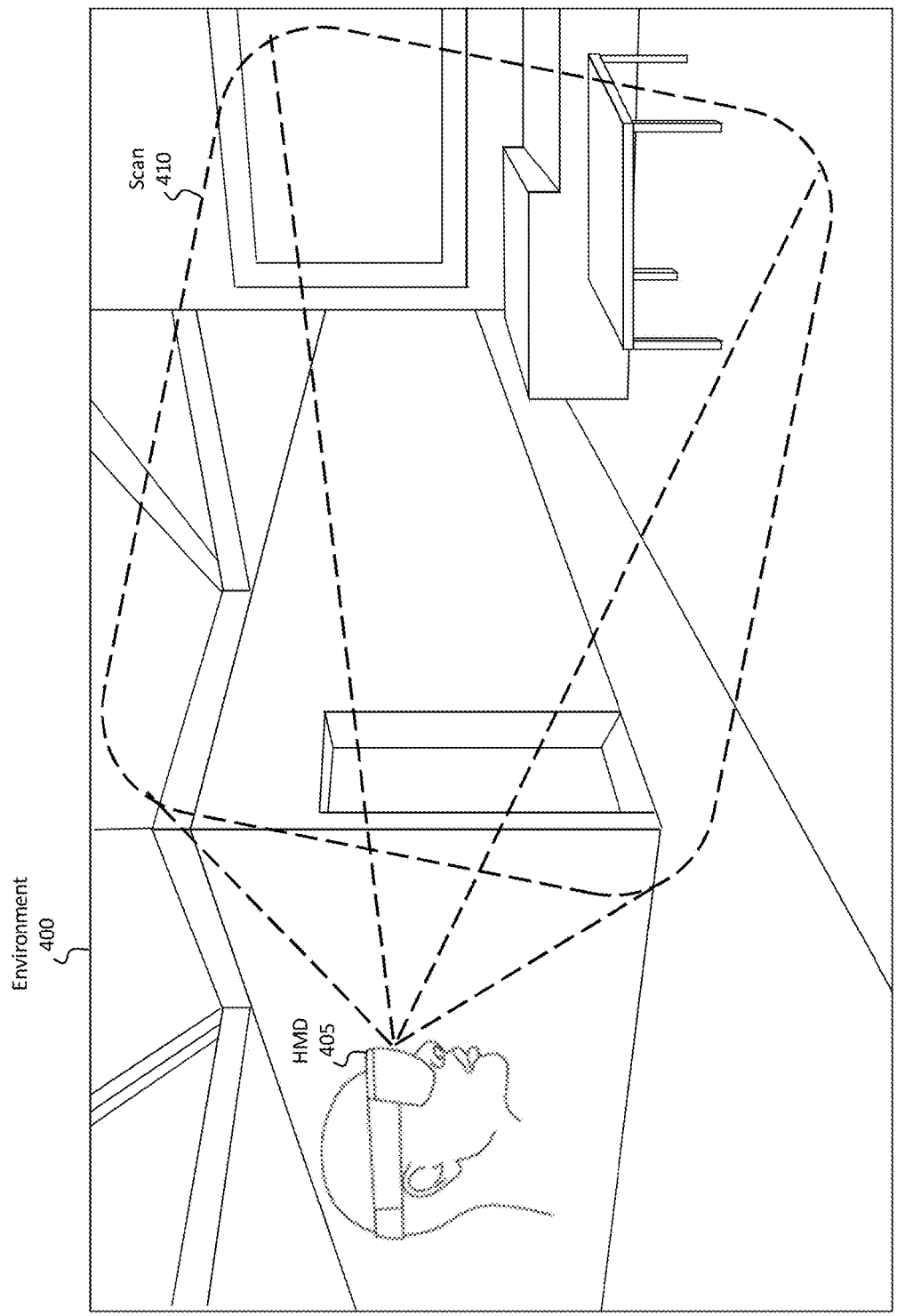
FIG. 4 illustrates an example environment that may be used to host holograms.

FIG. 4 shows a situation in which a HMD is generating a spatial mapping through use of its cameras. For instance, FIG. 4 shows an environment 400 that includes various different objects (e.g., the table, the door, the picture frame, etc.). Here, the HMD 405 is being used to map environment 400 three-dimensionally via the scan 410. The result of this 3D mapping process is a spatial mapping, such as spatial mapping 210A or 210B from FIGS. 2A and 2B, respectively, comprising a virtual representation of the environment. It will be appreciated that the resulting spatial mapping of environment 400 may be uploaded to a cloud environment for persistent storage, for use by the scanning HMD 405 and/or another HMD that is rendering the virtual representation of the environment with one or more holograms that are placed into appropriate locations based on the ranking of placement locations described herein.

Figure 5:
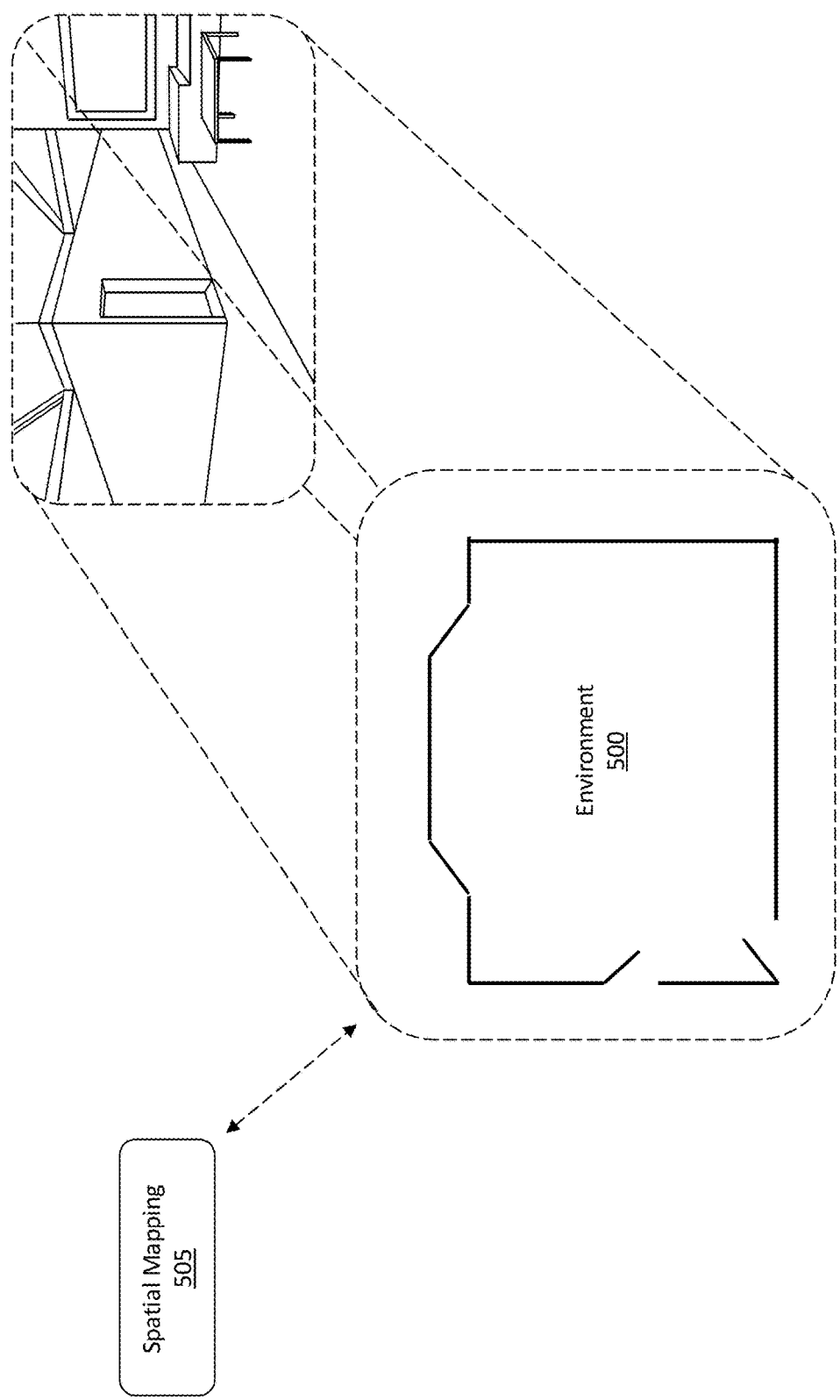
FIG. 5 illustrates how a spatial mapping can be correlated or otherwise linked to an environment.

FIG. 5 shows a high-level view of an environment 500 that is similar to the environment 400 of FIG. 4. FIG. 5 also shows a spatial mapping 505 which comprises a 3D digital/virtual representation of environment 500. Accordingly, the disclosed embodiments are able to use a data acquisition system (e.g., a HMD with cameras) to collect information about an environment and to generate a spatial mapping for that environment. Alternatively, the embodiments are able to access an already-built spatial mapping of an environment when performing the disclosed operations.

When determining where a hologram will be located, it is often desirable to either access an already-built spatial mapping (e.g., spatial mapping 210A from FIG. 2A) or to build the spatial mapping (e.g., as show in FIGS. 2B and 3). According to the disclosed embodiments, high-level information about the spatial mapping may be selectively exposed to a developer for consideration when deciding where to place a hologram. As used herein, a "developer" should be interpreted broadly and may refer to a human developer and/or to an autonomous computer system.

In addition to exposing the high-level attributes of the spatial mapping, certain placement location or candidate hologram placement location rankings may also be exposed to the developer. For clarification, a candidate hologram placement location refers to a location in the environment where one or more hologram can be suitably placed so that those holograms are not unduly hindered or otherwise unjustifiably restricted by the confines of the environmental location. For instance, using the example presented earlier, if a large dragon is to be placed in the environment, then clearly the dragon should probably not be placed underneath a very small coffee table. Instead, the large dragon should be placed at a location that can physically support the dimensions of the dragon. As such, the disclosed embodiments are able to dynamically identify locations that are suitable for hosting a hologram and then rank those locations based on a set of ranking criteria. As will be discussed in more detail later, these determinations may be based, at least in part, on the attributes of the hologram and/or the attributes of the environment, including its various different locations.

It will be appreciated that the spatial mapping is influential in determining these suitable locations. For instance, the embodiments are able to use the spatial mapping to understand the characteristics of the environment when determining which locations are adequately suited for hosting a hologram.

Spatial Mapping and Voxels

As discussed earlier, some of the disclosed embodiments provide only certain, high-level spatial mapping content and/or criteria information to a developer. This is beneficial, in some instances, because there may be a significant amount of information embedded in the spatial mapping and/or criteria information (e.g., metadata) that may be private or otherwise confidential. For instance, the detailed information in the spatial mapping or criteria may include information as to where the mapping device has previously been or whose device was used to generate the spatial mapping. As such, it is beneficial to restrict access to this confidential data.

In some implementations, the spatial mapping may include any number of "voxels." As used herein, a "voxel" is a volumetric element that, when placed with other voxels, is able to describe an object three-dimensionally. For example, similar to how a group of 2D pixels is able to portray an object two-dimensionally, a group of 3D voxels is able to portray an object three-dimensionally. In some implementations, a database of voxels, an index of voxels, or even a hierarchy of voxels may be used to track or describe information about the environment. Furthermore, some embodiments take the environment and divide it into these small cubic voxels. In some example use scenarios (as will be described in more detail to follow), voxels can be used to gauge the distances between objects in order to determine whether that space is adequate to place a hologram.

Furthermore, voxels can store Signed Distance Function (SDF) values which indicate a signed distance to the nearest surface. The SDF values can be used to identify zero crossings, which are locations where a wall or some other object surface is located. As an example, voxels located in front of a wall may be assigned a positive SDF value (e.g., relative to a HMD's current location) while voxels located behind the wall may be assigned a negative SDF value (e.g., relative to the HMD's current location). By identifying locations where positive SDF value voxels and negative SDF value voxels are near or proximate to each other, the embodiments are able to identify the presence of an object surface (e.g., the wall). This methodology provides a very fast and intuitive manner to identify objects within a room and to extract or reconstruct surface representations and geometries. It will be appreciated that voxel SDF values can be calculated as a running average of the input signal and thus filtering out the input signal noise to provide a more robust understanding of the environment using the array of voxels.

Additionally, as described earlier, it is often beneficial to safeguard some of the internal information (e.g., metadata) by preventing it from being distributed to outside users or developers. As such, any number of safeguarding operations may be put in place to ensure that only authorized information (including some voxel information) is made available to a developer.

It will also be appreciated that some embodiments group voxels together, perhaps based on characteristics attributed or associated with those voxels. For instance, instead of relying on individual voxels, some embodiments group a large number of voxels together to define an object (e.g., an entire wall). As such, a candidate hologram placement location may be associated with a single voxel, or, alternatively, it may be associated with a large number or group of voxels. As an example, an entire wall (represented by an entire wall of voxels) may be selected as a candidate hologram placement location. In some implementations, the entire wall of voxels may be subdivided into various different wall voxel portions (e.g., 2 portions, 3, 4, 5, 6, 7, 8, 9, 10, etc.) for consideration as a candidate hologram placement location.

An example will be helpful. Consider a situation in which a number of 4 centimeter (cm)×4 cm×4 cm voxels are used to describe an entire environment. By measuring the number of voxels that span the area between one object and another, the distance between those two objects can be measured or determined. This measurement can be used to facilitate the decision as to whether the area in between those two objects is suitable to host any kind of hologram (or a hologram of known characteristics). As such, voxels are quite helpful during the process of identifying candidate hologram placement locations.

It will be appreciated that the dimensions of a voxel may be set to any size. For instance, a voxel may be 1 cm×1 cm×1 cm. Other dimensions may be used, such that the voxel may be "a" cm×"b" cm×"c" cm element, where "a," "b," or "c" may be any number (e.g., 0.1, 0.2, 0.5, 0.75, 1.0, 1.1, 1.2, 1.3, 1.4, 1.5, 2, 3, 4, 5, 6, 7, 8, 9, 10, 50, 100, or more than 100 cm).

Figure 6:
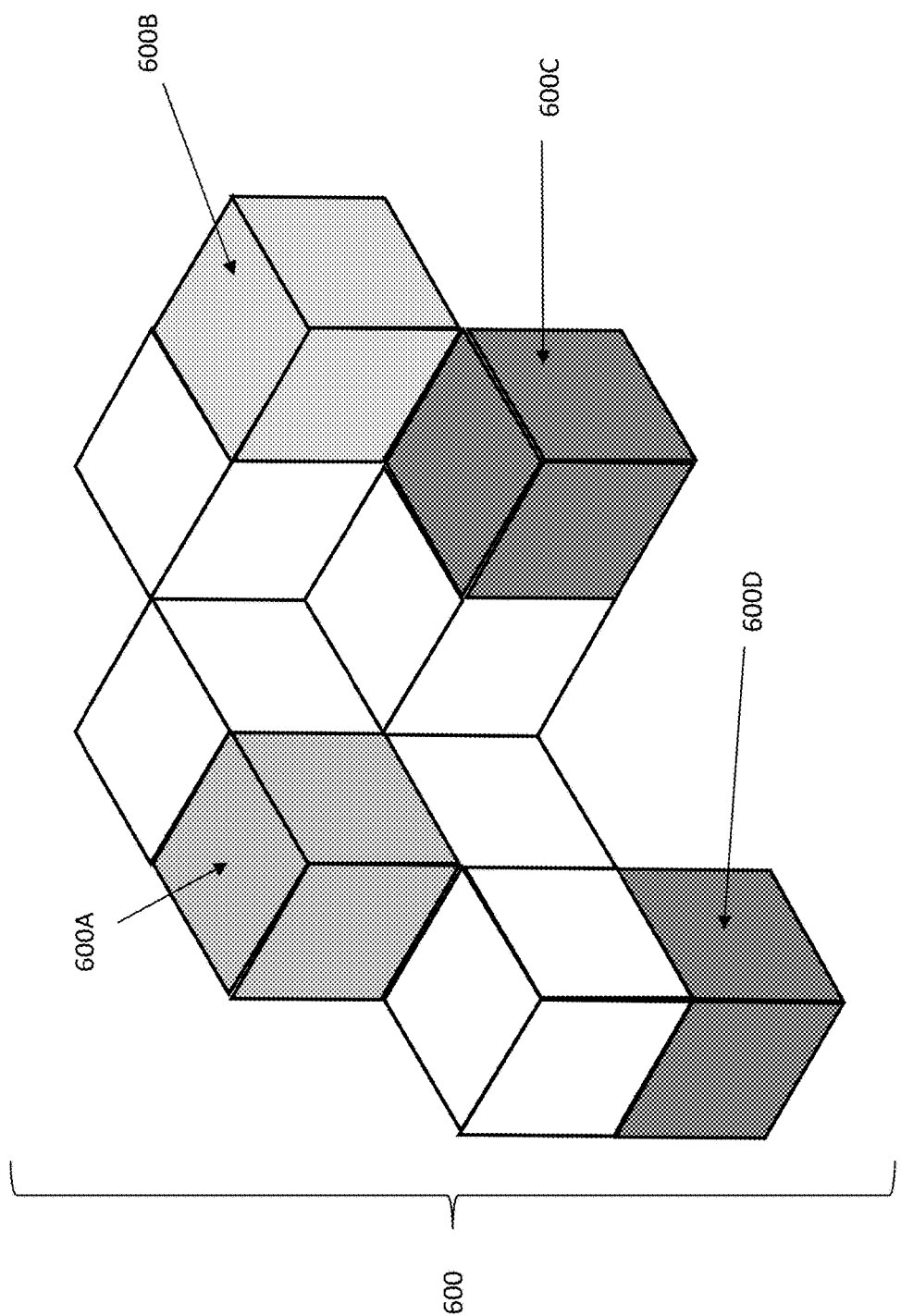
FIG. 6 illustrates an example configuration of an array of voxels, which are volumetric elements that define or otherwise represent an object or area in 3D space.
Figure 7:
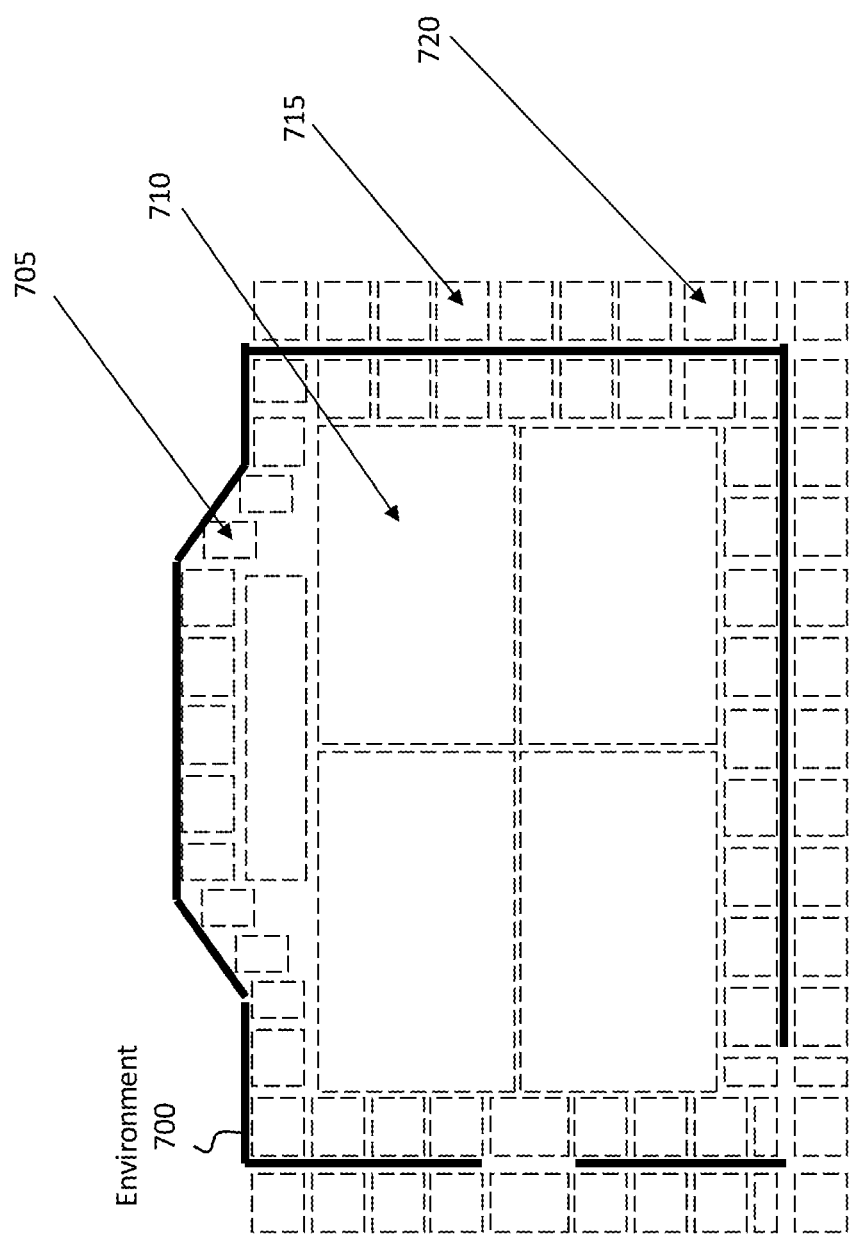
FIG. 7 demonstrates how an array of voxels may be used to define or represent an environment.

FIG. 6 shows an array of voxels 600 that includes voxels 600A, 600B, 600C, and 600D. Although only four voxels are labeled (and only nine are shown), it will be appreciated that any number of voxels may be present. Furthermore, by organizing the voxels in a defined manner, the array of voxels 600 can be used to represent the geometric contours of any type of object (e.g., a chair, a table, a person, an animal, a room, etc.). With that understanding in mind, attention will now be directed to FIG. 7 which shows an example environment 700 that is being represented three-dimensionally by an array of voxels.

Environment 700 is shown as being represented by voxels 705, 710, 715, and 720 (more are shown but not labelled simply for brevity purposes). Here, the voxels are organized in a manner to show how the walls of environment 700 are arranged as well as the open spaces of environment 700. It will be appreciated that if there were any objects located within environment 700 (e.g., tables, chairs, beds, etc.), then the voxels would be appropriately arranged to show those objects as well.

Figure 8:
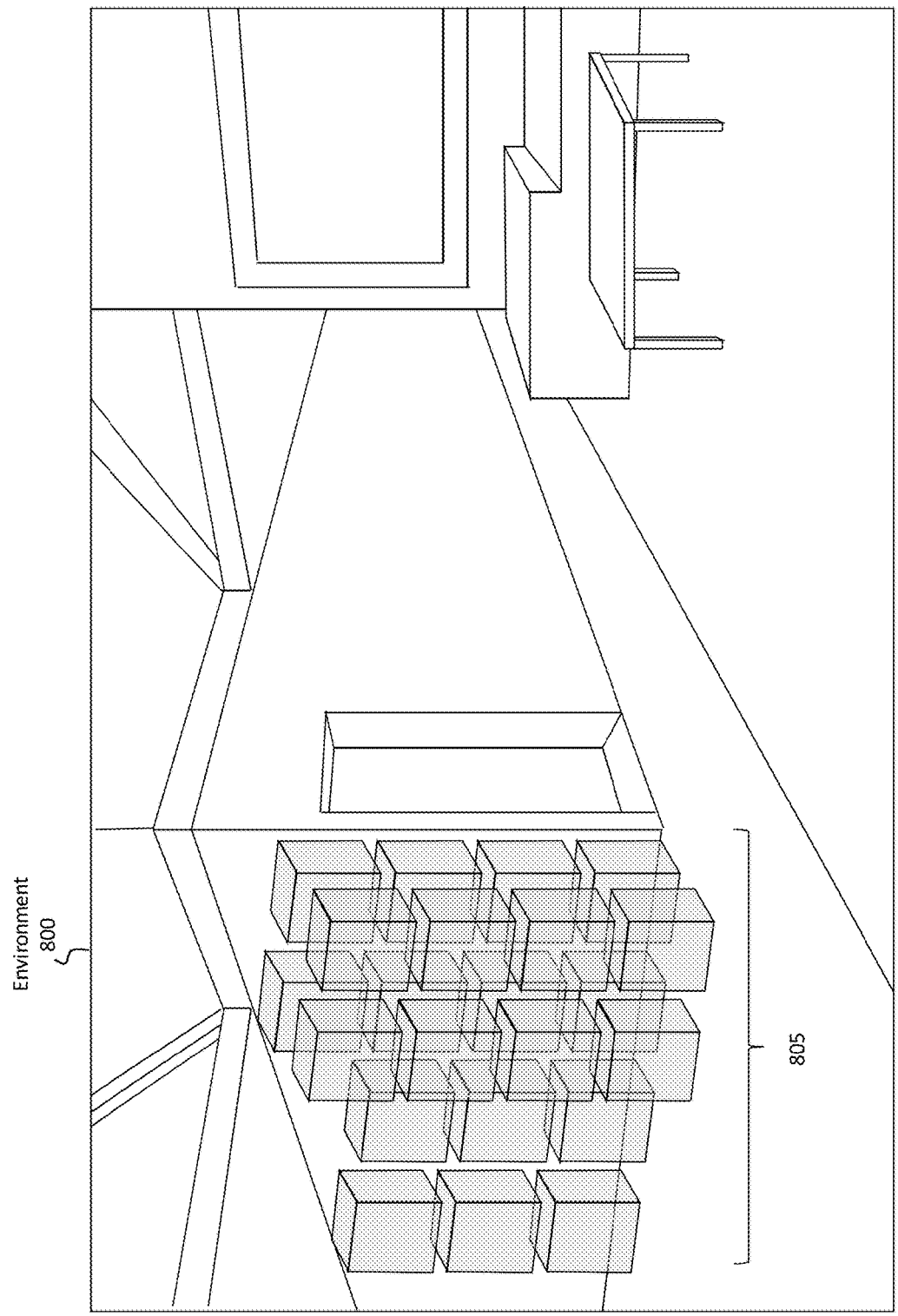
FIG. 8 illustrates another example of how voxels may be used to represent an environment and how some voxels may be used or organized to represent both occupied space and/or empty space within the environment.

FIG. 8 provides another example view of how voxels may be used to describe (three-dimensionally) an environment. Specifically, there is shown an environment 800 with an array of voxels 805 describing a portion of environment 800 (e.g., the leftward wall of environment 800). In this manner, an array of voxels may be used to represent the geometry of any kind of environment. The disclosed embodiments are able to capitalize on the use of voxels in order to determine suitable locations for placing holograms.

It is also possible to use voxels to store, maintain, track, or otherwise form an association between the voxel and a plethora of additional information about the environment. For instance, weighting values can be assigned to each voxel based on the number of times a particular voxel was observed (additional methodologies of "observing" will be described in detail later). In some circumstances, voxels can be used as a type of heat map that is used to help in the process of measuring visibility attributes and other attributes of an environment.

Selecting and Ranking Candidate Hologram Placement Locations

Figure 9:
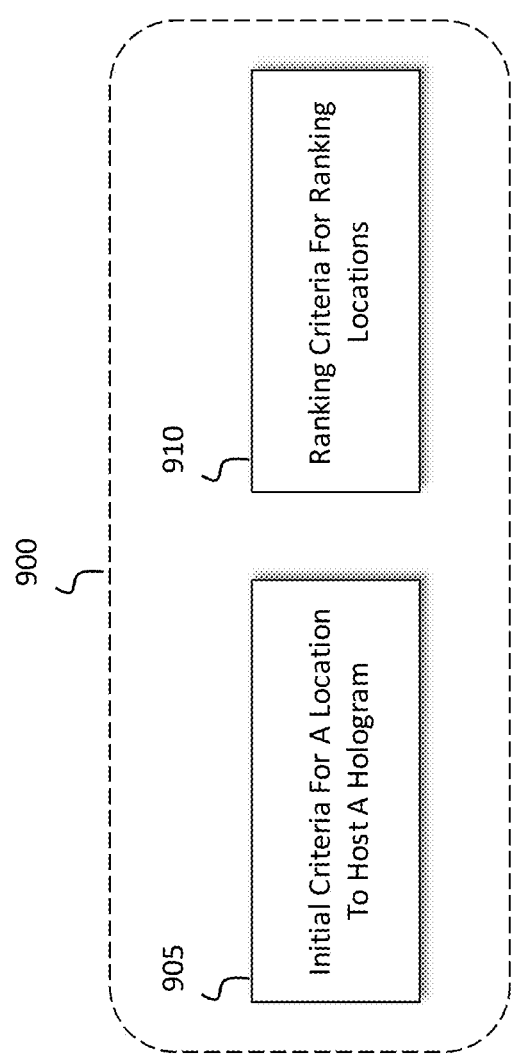
FIG. 9 illustrates some of the criteria that may be used when either identifying potential placement locations for holograms or ranking those potential placement locations.
Figure 10:
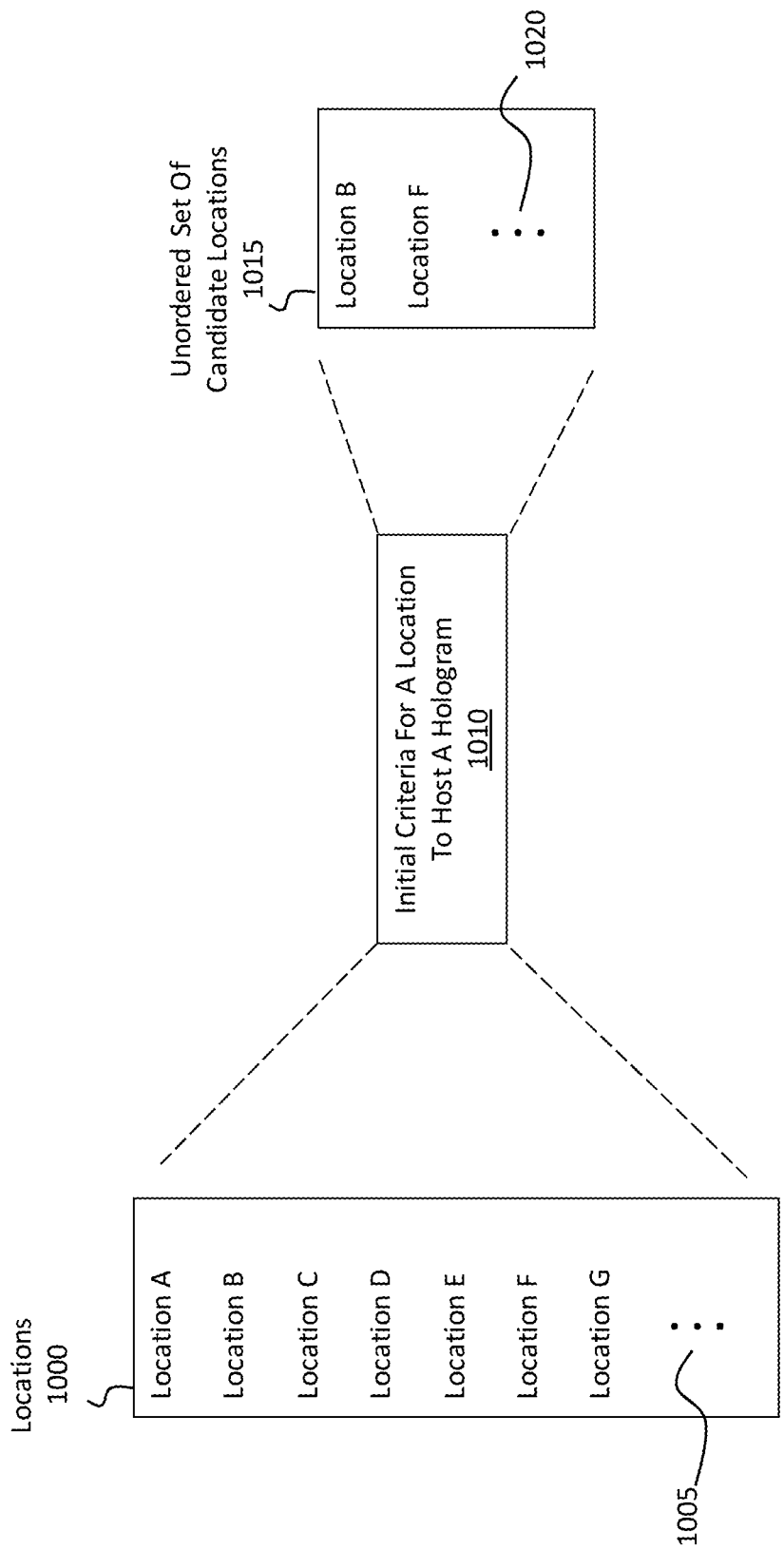
FIG. 10 illustrates how an initial set of criteria is used to determine whether any given location in an environment is suitable for hosting a hologram.

Attention will now be directed to FIG. 9 which shows a compilation of criteria 900 that may be considered when selecting candidate hologram placement locations and when ranking those locations within an environment. As shown, the compilation of criteria 900 includes at least two different criteria, the first being a set of initial criteria 905 to determine whether a given location is suitable to host a hologram and the second being a set of ranking criteria 910 to rank a compiled set of suitable candidate hologram placement locations. FIG. 10 more fully describes the set of initial criteria 905 while FIG. 11 more fully describes the set of ranking criteria 910. Some of the disclosed embodiments initially identify one or more locations within the environment. These locations are selected because, after analyzing the environment and in particular the spatial mapping of the environment, it is determined that these locations are suitable to host a hologram. Once a number of locations are identified, then the embodiments rank those locations using the set of ranking criteria 910. Such operations are particularly beneficial because they help the developer in determining where to actually place a hologram.

Accordingly, attention will now be directed to FIG. 10 which shows how any number of suitable locations may be identified from within an environment. As shown, there is an initial set of locations 1000 (e.g., locations A, B, C, D, E, F, and G, with the ellipsis 1005 demonstrating that any number of locations may initially be present). An example of these locations 1000 may be any of the locations where the voxels 805 from FIG. 8 are located. For example, location A may correspond to the top right-most voxel, location B may correspond to the voxel immediately under location A, and so on. Therefore, in some embodiments, voxels may be used to identify the list of all locations 1000 in the environment.

Some locations may not be suitable to host a hologram. As such, the embodiments utilize a set of initial criteria 1010 (which is representative of the set of initial criteria 905 from FIG. 9) that defines certain characteristics, features, parameters, attributes, or other criteria that a location must have in order to qualify to host a hologram. This set of initial criteria 1010 may include or consider attributes of the hologram, attributes of the location, attributes of future events that may be scheduled to occur at that location, and/or any other information.

In some instances, the initial criteria 1010 includes characteristics that define the size of the hologram, the interactive features of the hologram (e.g., whether the hologram is simply a for-viewing-purposes-only type of hologram or whether the hologram is of a type that a user can interact with or otherwise manipulate), the timing of the hologram (e.g., when will the hologram be active), the mobility characteristics of the hologram (e.g., can the hologram deviate from its original position), a determined type of the hologram, and/or even determined attributes of a user who will likely engage with the hologram, and/or attributes of the HMD hardware that is used to render the hologram(s).

It will be appreciated that selecting a suitable hosting location (or multiple locations) for a hologram will likely largely depend on the type of hologram. As an example, consider a hologram that shows a news feed in the form of a newspaper. Due to its relatively simple form, a large number of locations may be suitable for hosting this hologram. To illustrate, walls, desktops (or other types of counters), or even just an open floating space may be suitable locations for this type of hologram. In contrast, consider a hologram of a full sized sports car. Because this type of hologram is an automotive type, it may not be appropriate to display this hologram in a kitchen environment. Rather, it may be appropriate to display the hologram outdoors or in a garage environment.

In other instances, the disclosed embodiments include analyzing features of the environment (dynamically determining attributes of the features in the environment) and/or by identifying tagged metadata associated with scanned objects in the environment, to further determine whether a location is appropriate for a hologram placement and/or how multiple placement locations should be ranked relative to each other for placing the hologram(s). For example, consider a holographic Easter egg hunt scenario, where virtual eggs for children are to be distributed in an environment. In this example scenario, a dining room with a table and many chairs may be an ideal location to virtually hide the virtual eggs. In contrast, a garage with many tools and other potentially dangerous objects may not be a suitable location in which to place Easter eggs for children to find. The potentially dangerous objects can be determined to be dangerous based on metadata linked to the objects in the spatial mapping and/or based on dynamic identifications of the objects and correlations to stored attributes for those objects. As such, the disclosed embodiments are able to analyze the characteristics of the environment in determining whether the environment (and particular locations within the environment) is suitable to host one or more holograms.

Accordingly, by filtering the locations 1000 through the set of initial criteria 1010, the embodiments are able to generate an unordered set of candidate hologram placement locations 1015 (e.g., location B and F, with the ellipsis 1020 demonstrating that any number of locations may possibly be selected as suitable locations).

Figure 11:
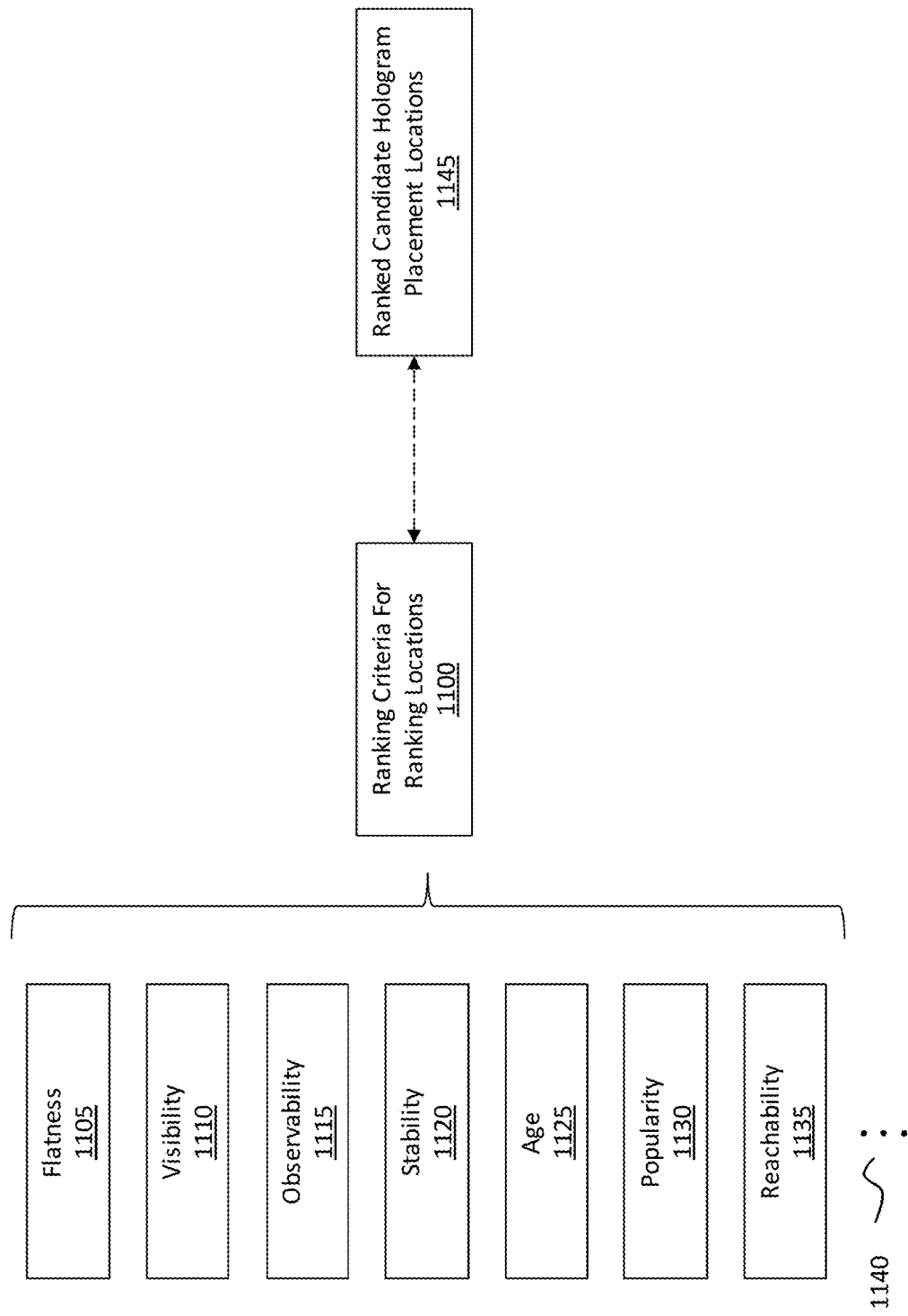
FIG. 11 illustrates a set of criteria or rules that are used to rank candidate hologram placement locations that were identified as being suitable candidates to host a hologram.

While FIG. 10 showed some examples of how candidate hologram placement locations may be identified, FIG. 11 shows how those candidate hologram placement locations may then be ranked, prioritized, or otherwise ordered against one another. For instance, FIG. 11 shows a set of ranking criteria 1100 for ranking locations. This set of ranking criteria 1100 is an example representation of the set of ranking criteria 910 shown in FIG. 9. It will be appreciated that the resulting set of ranked candidate hologram placement locations is generated in a manner so as to be hardware platform and OS agnostic.

The set of ranking criteria 1100 includes the following: a flatness determination 1105, a visibility determination 1110, an observability determination 1115, a stability determination 1120, an age determination 1125, a popularity determination 1130, and a reachability determination 1135. The ellipsis 1140 demonstrates that other factors may be included as well. As such, the factors/criteria shown in FIG. 11 are simply examples and should not be considered exclusive or otherwise binding. Furthermore, the set of ranking criteria 1100 may include any one or combination of the above criteria. Using the set of ranking criteria 1100, the embodiments are able to rank what was previously an unordered set of candidate hologram placement locations so as to generate a ranked set 1145 of candidate hologram placement locations. Once ranked, then this ranked set 1145 may be provided or otherwise exposed to a developer for consideration in determining where to actually place a hologram.

The flatness determination 1105 corresponds to a calculated flatness of a surface or planar region within the environment. It will be appreciated that if a floating space in the air is being considered as a candidate hologram placement location, then the flatness determination 1105 will be largely irrelevant because the floating space has no surface for measuring flatness. For planar surfaces (e.g., desktops, countertops, walls, floors, etc.), the flatness or smoothness of the surface may influence whether that surface is to be weighted more or less heavily in gauging whether a hologram should be located there (i.e. the ranking). As an example, consider the earlier scenario involving the news feed hologram that was in the form of a newspaper. Here, a flat surface is likely to be considered advantageous or of a high priority when a newspaper hologram is used. As such, surfaces that are flat may be ranked higher than surfaces that are irregular. In contrast, a flat wall may be irrelevant for a sports car hologram, but a flat floor may be highly relevant. Accordingly, the flatness of a candidate hologram placement location may be influential when ranking candidate locations.

The spatial mapping is particularly useful in determining the flatness of a candidate hologram placement location. For example, during a surface reconstruction process, which may be used to construct the spatial mapping, it is possible to also compute the flatness of a surface. Additionally, the use of voxels is beneficial for determining the flatness of a surface (e.g., using the zero crossing principles that were discussed earlier). As such, in some embodiments, the set of pre-defined hologram placement criteria (i.e. the set of ranking criteria 1100) may include a flatness determination for a planar surface in the environment. As an alternative variation, if the spatial mapping system is not able to perform surface reconstruction, the system can nevertheless compute flatness by finding the average distance between a surface and any feature points or other types of protruding points near the surface.

The visibility determination 1110 correlates to how visible the location is from multiple viewpoints or vantage areas. This particular criteria will be discussed in more detail in connection with FIGS. 12 through 18. By way of a brief introduction, however, some embodiments identify a candidate hologram placement location and then cause virtual light rays to be emitted from that location. Subsequently, these embodiments attempt to detect these virtual rays of light (e.g., by determining whether the virtual light rays strike near objects or far objects) and determine the visibility attributes for that candidate hologram placement location. Alternative variations include creating a virtual sphere around a candidate hologram placement location. Once this virtual sphere is generated and in place, then some embodiments measure intersections or overlap events (over a determined period of time) that occur between the virtual sphere and the HMD's field of view frustums. The resulting visibility determination is then a percentage of the sphere's area that was intersected during the period of time. Additional details on these variations will be provided later.

The observability determination 1115 correlates to how much of the candidate hologram placement location is either unobserved or is adjacent to an unobserved volume or area of space. For instance, some of the embodiments cover the scanned environment with a grid of virtual voxels. Each voxel is able to be associated with certain information regarding the number of times it was observed. Determining the number of observations may be performed by tracking the number of times the particular voxel was inside or captured by the mixed-reality device's field of view. An alternative variation to determining the number of observations is to monitor or track the user's eye movements and count the number of times that the user's pupils pass over or near the voxel. Accordingly, it is possible to compute an observability metric as a percentage of observed (or partially observed or even nearly observed) voxels at or near the candidate placement location.

The stability determination 1120 correlates to how stable the candidate hologram placement location is expected to be when compared with the overall environment and/or other portions of the environment (e.g., how stable a particular location is anticipated to be relative to the real world). This criteria addresses issues where a hologram drifts away from the original placement location, which can happen due to a lack of nearby trackable feature points or anchor points. For instance, consider an example environment that includes a chair and a bed. Typically, once a bed is placed at a particular location, then it stays at that location for an extended period of time. As such, the stability of that bed is likely to be considered relatively high. In contrast, chairs are often moved and rarely stay at one position for an extended period of time. Therefore, as compared to the bed, the chair's stability is relatively lower.

Another factor, which is somewhat related to the stability determination 1120, is a transience factor. An estimated "transience" or "mobility" associated with the candidate hologram placement location can also be determined. The transience factor generally deals with determining how likely an object is to move such that it is not likely to be a permanent fixture or stay at one location for a prolonged period of time. If the estimated transience exceeds a defined tolerance margin or threshold, then the transience determination may cause the candidate hologram placement location to have a reduced ranking. In some embodiments, transience, just like stability, is also calculated as an amount of trackable feature points or anchor points around the candidate hologram placement location.

In this regard, there may be some situations or time periods where an object that is identified as being a transient object (e.g., a swinging door or a chair) and that is located within the environment is determined to have higher transient attributes such that they surpass a particular threshold. As a consequence, the transient object will likely fail to satisfy the transience criteria, and the transient object will not be determined to be suitable for hosting a hologram.

Regarding the age determination 1125, this criterium considers the last time the candidate placement location was observed. To do so, some embodiments cause the voxel grid/array to also be associated with a first and last timestamp (for each voxel or set of voxels) to track or record when each voxel or set of voxels was observed by the mixed-reality device. Age is then calculated as the difference between the penultimate timestamp and the last or most current timestamp of the voxels at or near the candidate hologram placement location. The observation of the voxels may be performed in the manner described earlier in which the mixed-reality device's field of view frustums are used. In some embodiments, every time the candidate hologram placement location is observed, its age is reset to zero or some baseline measurement. In this regard, the embodiments are able to dynamically consider the age of a candidate hologram placement location when ranking that location. Additionally, the timestamps can be tracked and analyzed to provide useful feedback for the developer as well as for ranking the candidate hologram placement locations.

The age determination 1125 is useful for a number of other reasons as well. First, locations that are observed very frequently (and thus continuously have a very low age) may be highly sought-after areas, particularly for advertisements or other types of highly interactive holograms. As such, these highly observed candidate hologram placement locations can be classified as premium locations where only specialized or explicitly authorized types of holograms may be placed. In contrast, candidate hologram placement locations that are old or stale may not be considered premium or prime locations. Of course, it will be appreciated that the type of hologram or the type of augmented environment will influence whether a location is prime or not. For example, in the Easter egg hunt situation, the old/stale locations may actually be very worthwhile to hide an egg. Therefore, a candidate placement location's age, whether old or young, may be highly influential depending on the type of virtual scenario and/or the type of hologram that is being presented to the user.

The popularity determination 1130 corresponds to how often this location is observed over a given period of time. As such, the popularity determination 1130 is somewhat similar to the age determination 1125 and the observability determination 1115. In some regards, the popularity determination 1130 may be computed as an average of the number of times the candidate hologram placement location was observed over a selected number of time periods. For example, a particular candidate hologram placement location may be highly popular during breakfast hours, but may be less popular or even unpopular during lunch hours. As such, the popularity determination 1130 can be used to gauge when a candidate hologram placement location is routinely observed.

The information that is used to track the times a location is observed may be stored in the voxel array or any other data structure that identifies attributes for the different locations.

An example that utilizes both the age and popularity determinations will now be presented. Consider a scenario where a user spends a majority of his/her time on the sofa watching a TV mounted on the wall. Because of the user's behavior and habits, the wall behind the TV becomes a prime location because of its perpetual young age and because of its high popularity as a result of being so near to the TV. Consequently, this area may be ranked very highly as a candidate hologram placement location.

The reachability determination 1135 correlates to a decision or determination as to whether a walking path or other type of access path from the user's current location to the candidate hologram placement location is available and/or convenient to traverse. For example, this determination includes identifying whether there is an access path between one point (not necessarily the user's current location) and another point. To compute this determination, some embodiments virtually extend (in an outward direction) one, some, or all detected feature points and/or vertices of a reconstructed surface to determine whether those feature points impose or otherwise restrict a pathway between the starting location and the ending location as well as from a height above ground level up to a pre-selected height threshold or margin (e.g., 2 meters above the floor's plane). The pre-selected height threshold is relevant because the user has to be able to traverse the path, and it may be highly inconvenient or impossible for the user to traverse the path (e.g., perhaps by crawling on his/her hands and knees). Alternatively, the purpose of the virtual environment may be to purposely cause the user to contort his/her body when traversing the path (e.g., a difficult maze). Regardless of the purposes, the embodiments are able to determine whether there is a navigable path between one location and another location. In this regard, the reachability determination 1135 can be thought of as the width of the thickest and/or highest path from a starting location to the candidate hologram placement location that does not touch or intersect the projected feature points, 3D mesh, and/or any other world surface representation computed by a spatial mapping algorithm.

It will be appreciated that a developer is also able to manually enter additional criteria into the set of ranking criteria 1100. As such, the developer can customize or otherwise tailor the criteria (e.g., via a menu or other type of user interface) to meet his/her needs or desires. Furthermore, these customizations may be made based on knowledge privy to the developer, to thereby result in a better ranking process.

It will also be appreciated that this set of ranking criteria 1100 is used to prioritize any number of candidate hologram placement locations. By organizing these locations based on a defined ranking, the developer will be able to quickly view the list of locations and determine where a hologram may best be located. Of course, it will be appreciated that some criteria may be considered or weighted more heavily than other criteria (e.g., the developer might express that a flatness determination is of primary importance). Consequently, by imposing the set of ranking criteria 1100 onto the unordered set of candidate hologram placement locations, a set of ranked candidate hologram placement locations can beneficially be generated.

Visibility Attributes

Figure 12:
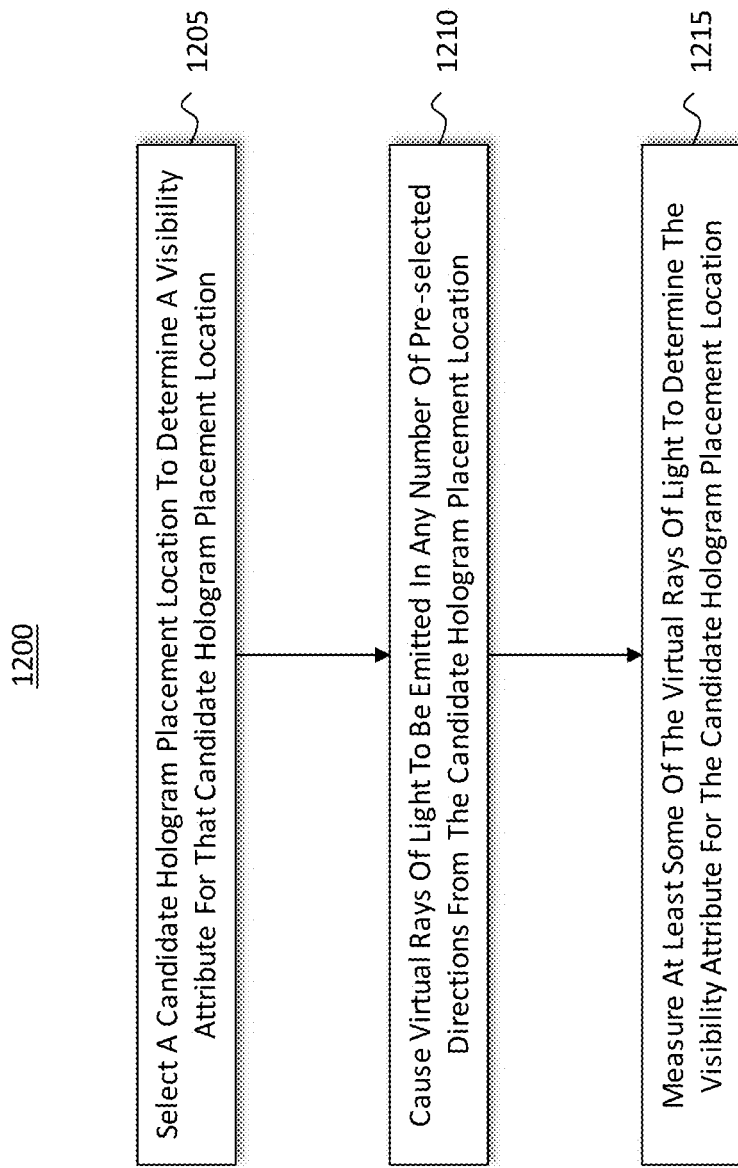
FIG. 12 illustrates an example method for determining a visibility attribute, parameter, or characteristic of a particular candidate hologram placement location.
Figure 13:
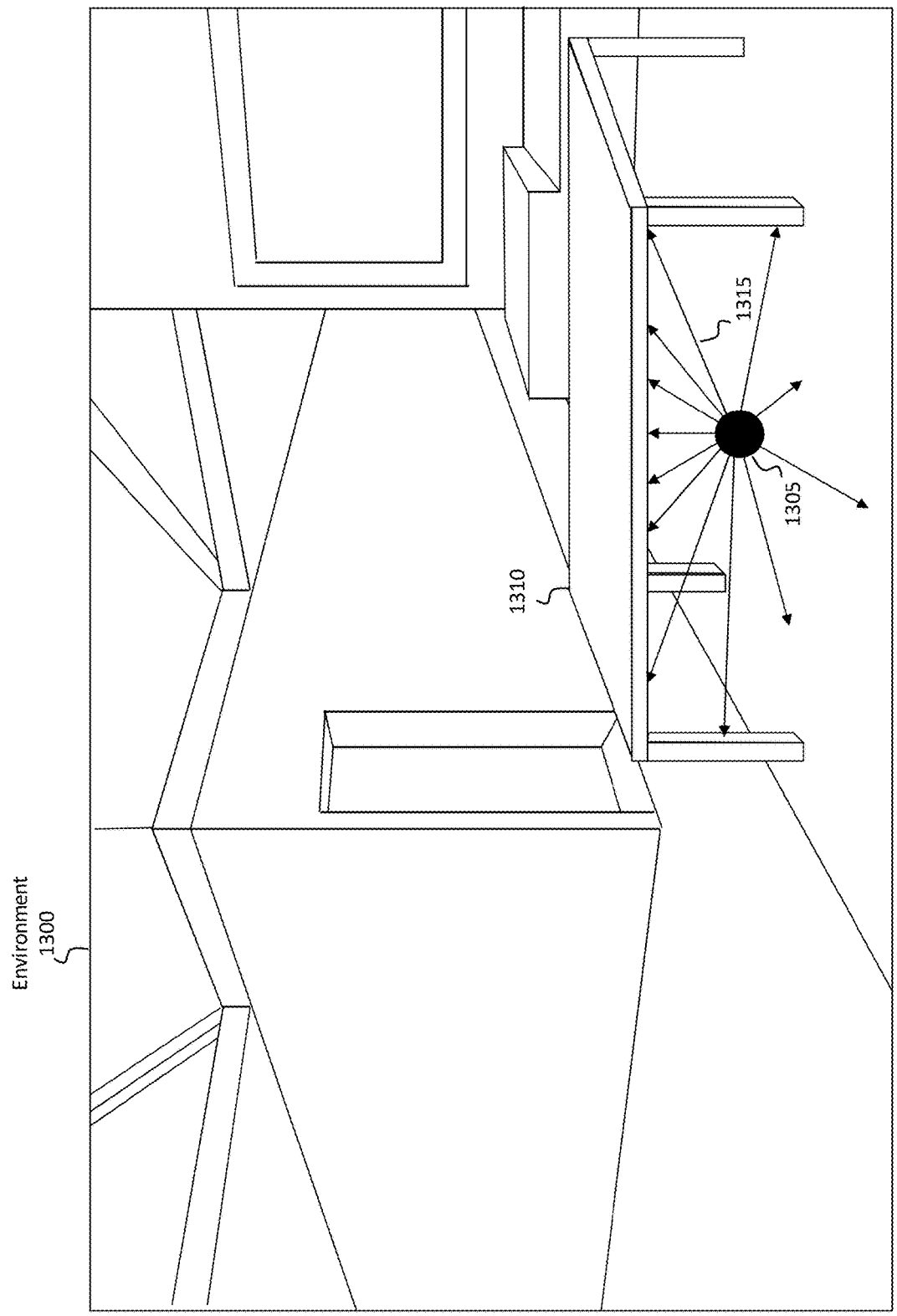
FIG. 13 illustrates an example scenario showing how virtual rays of light can be projected outwardly from a selected candidate hologram placement location in order to determine that location's visibility characteristics.
Figure 14:
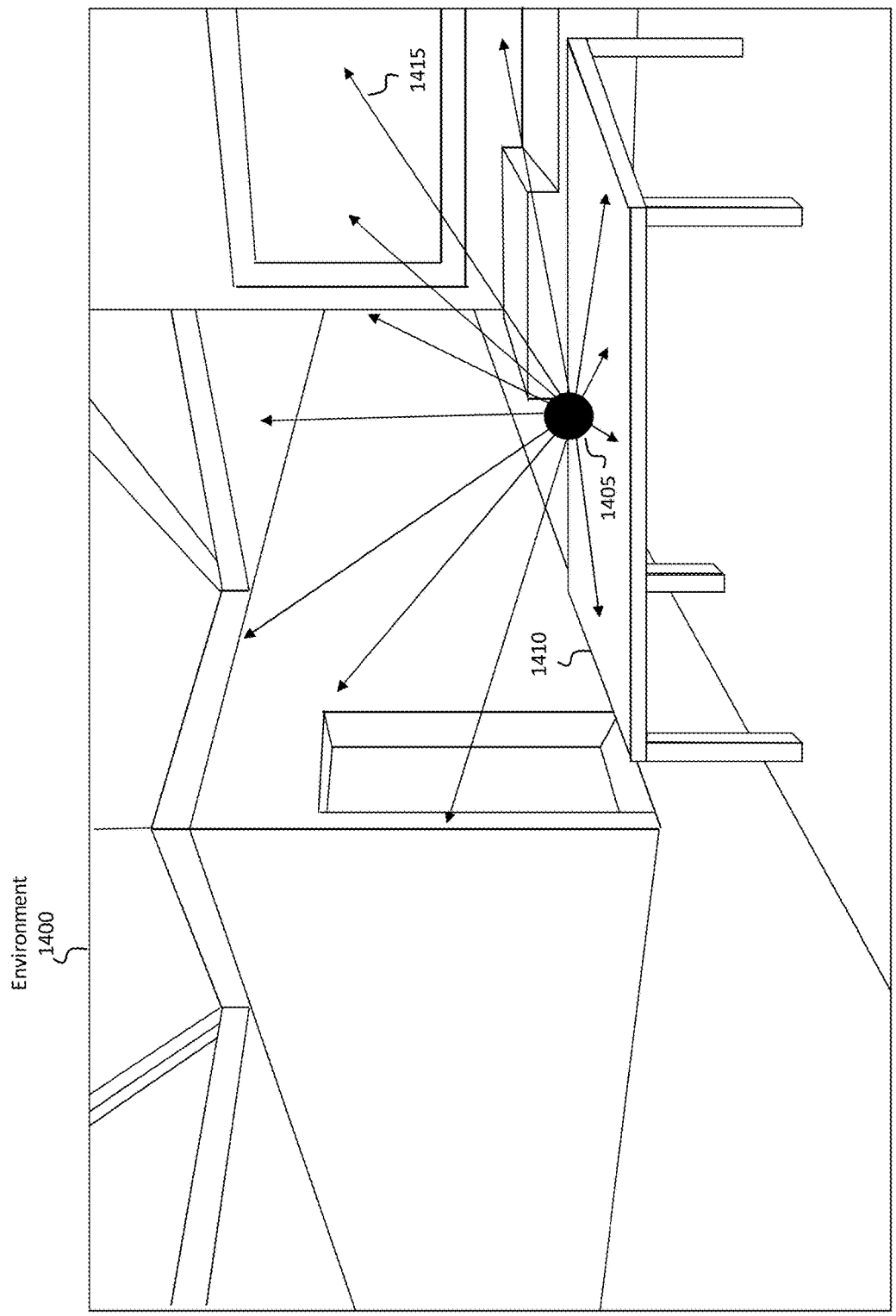
FIG. 14 illustrates another example scenario of projecting virtual light rays to measure or gauge visibility.

As described earlier, one of the factors that is considered when ranking candidate hologram placement locations includes a visibility determination, which is a determination used to estimate the number of vantage points from which a particular candidate hologram location is viewable. Determining this visibility metric may be achieved in a number of different ways. FIGS. 12 through 14 demonstrate one example methodology for making this determination while FIGS. 15 through 18 illustrate another example methodology. As a general matter, the embodiments presented and discussed in connection with FIGS. 12 through 18 focus on determining a visibility attribute for a particular candidate hologram placement location. For a particular physical location corresponding to a candidate hologram placement location, a corresponding visibility determination for that particular physical location can be made. In some instances, this determination may be based on a quality and/or quantity of distinct vantage points that are determined to be associated with each corresponding physical location, as will be described in more detail below. The visibility attributes are stored in the voxel array or another data structure that maps attributes for the different locations.

FIG. 12 illustrates a flowchart 1200 of an example method for determining the visibility of a particular candidate hologram placement location. Initially, a candidate hologram placement location is selected to determine a visibility attribute for that location (act 1205).

Subsequently, virtual rays of light are caused to be outwardly emitted from the candidate hologram placement location (act 1210). In other words, the virtual light rays are sourced at the candidate hologram placement location and are directed or projected outward in any number of preselected directions. In some instances, the rays of light may be a finite set of tightly focused rays of light while in other situations they may be more akin to a flood of light that is dispersed in all directions.

Thereafter, at least some of the virtual rays of light are then measured to determine the visibility attribute of that location (act 1215). For example, if the average length of the collective whole of the virtual rays of light is relatively large (i.e. they generally extend outwardly for a larger distance or length prior to striking an object), then it is determined that there are few hindrances or impeding objects blocking the view to the candidate hologram placement location. In contrast, if the average length of the virtual rays of light is relatively short (i.e. they generally extend outwardly for only a smaller distance or length prior to striking an object), then it can be determined that there are substantial hindrances blocking the view to the candidate hologram placement location. Accordingly, if multiple virtual rays of light are projected, then the visibility attribute is, in some instances, based on the average total length of all of the virtual rays of light.

FIG. 13 shows a practical example of the method presented in FIG. 12. Specifically, there is an environment 1300 that includes different objects (e.g., a hallway, a doorway, a picture, a table, etc.). In this example scenario, a candidate hologram placement location 1305 has been selected (i.e. it is underneath the table 1310). As discussed in the example method, virtual light rays 1315 are emitted outwardly from the candidate hologram placement location 1305. Because of its location underneath the table 1310, the candidate hologram placement location 1305 is not very visible, as shown by the virtual light rays 1315 traveling only a short distance before being impeded by the table 1310. By detecting the length, presence, or absence of the virtual light rays 1315, a determination can be made regarding how visible the candidate hologram placement location 1305 is.

FIG. 14 shows a similar example scenario, but now the candidate hologram placement location is placed in a highly visible location. For instance, in the environment 1400, the candidate hologram placement location 1405 is on the top surface of the table 1410. Here, a majority of the virtual light rays 1415 are very long and travel a large distance before striking other objects. Although some of the virtual light rays 1415 are shorter (e.g., the ones striking the table 1410), the overall average length of the virtual light rays 1415 is relatively high. Consequently, the candidate hologram placement location 1405 is considered to be highly visible from many different detecting locations.

Figure 15:
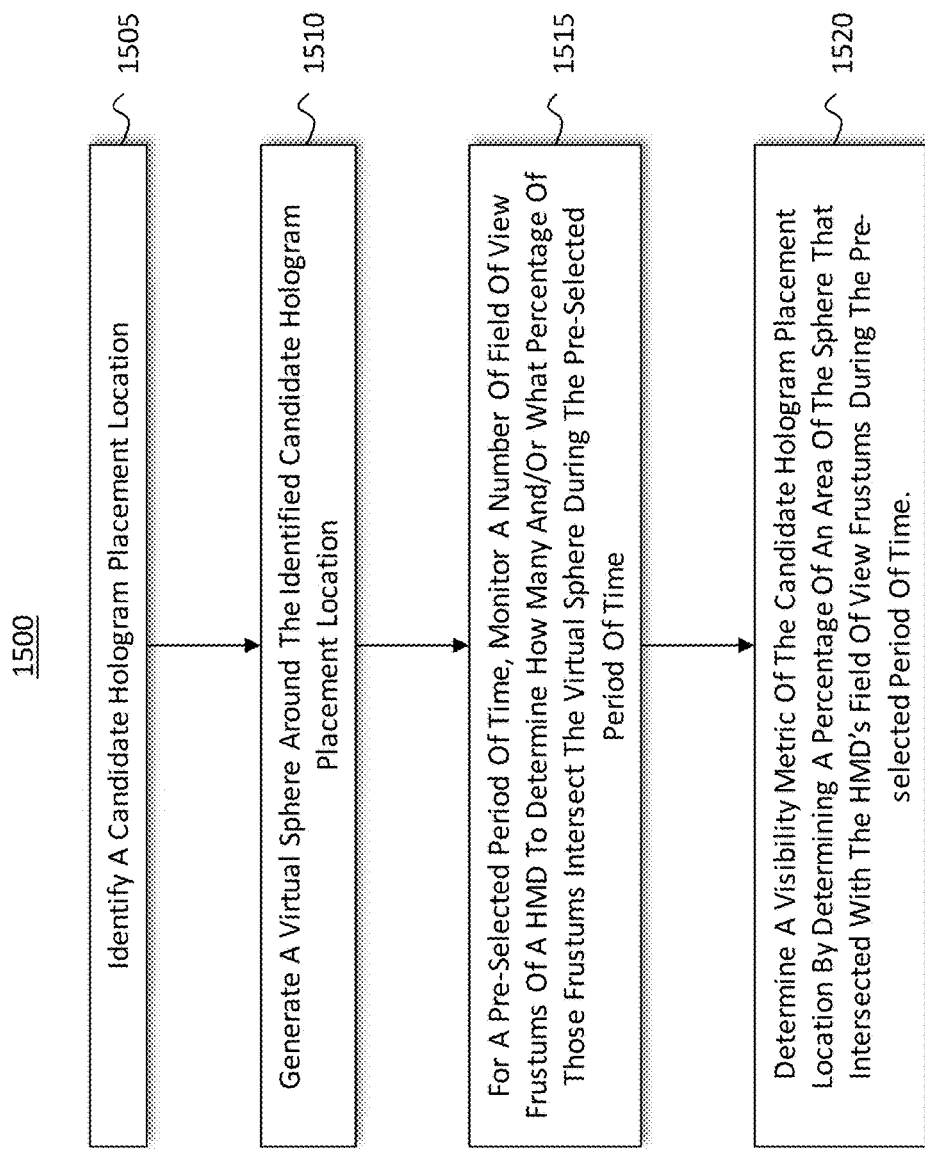
FIG. 15 illustrates an alternative example method for measuring a location's visibility.

FIGS. 15 through 18 illustrate another methodology for determining a location's visibility. In FIG. 15, a flowchart 1500 of an example method is provided. Initially, a candidate hologram placement location is identified (act 1505). This step may be performed in the manner described earlier in connection with FIG. 10.

Once this location is identified, then a virtual sphere is generated around that location (act 1510). Because this sphere is a virtual sphere, this process is performed programmatically. In some embodiments, this is achieved by placing an additional array of voxels (or grouping the existing array of voxels in that area) around the candidate hologram placement location in the shape of a sphere. In other embodiments, this is achieved simply by tracking location data in the form of a sphere around the candidate hologram placement location. Of course, it will be appreciated that other shapes (e.g., cubes, pyramids, rectangular prisms, etc.) may be used in place of a sphere. In some implementations, the shape or size of the virtual bounding entity (e.g., the sphere) may correspond to or may be dependent on a shape or size of a subsequent hologram that is anticipated to be placed at that location.

Subsequently, a number of a HMD's field of view frustums (boundaries) are monitored for a pre-selected period of time (e.g., 1 second, 5 seconds, 10 seconds, 30 seconds, 1 minute, 2 minutes, 5 minutes, 10 minutes, etc.) (act 1515). This monitoring is performed in order to determine how many and/or what percentage of those frustums intersect the virtual sphere during the pre-selected period of time.

Figure 16:
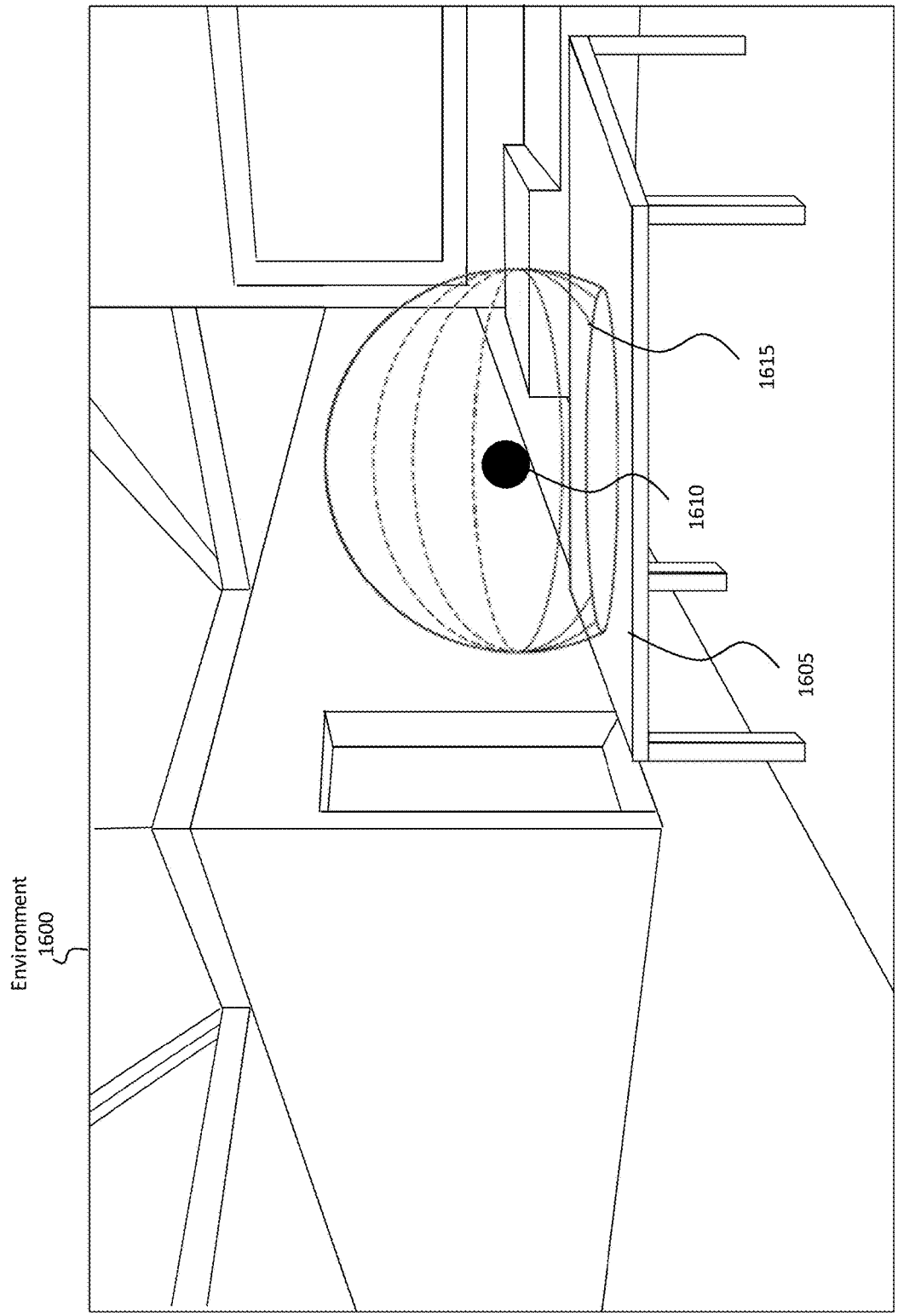
FIG. 16 illustrates how a virtual sphere can be constructed around a candidate hologram placement location to determine how much of the virtual sphere is actually viewed by a HMD's field of view over a given period of time.
Figure 17:
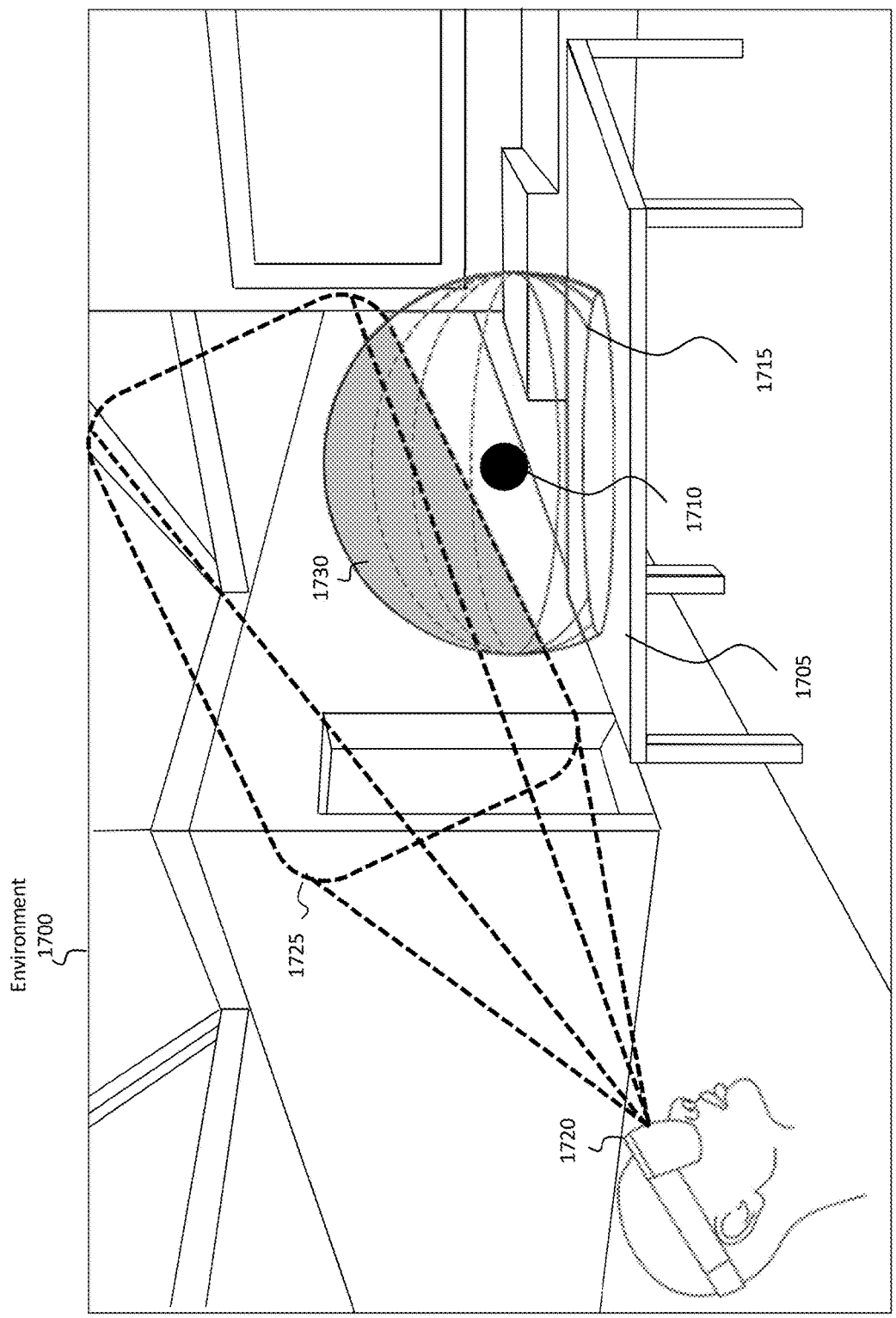
FIG. 17 shows how, at one point in time, a certain percentage of the virtual sphere is overlapped by the HMD's field of view.

Finally, a visibility metric of the candidate hologram placement location is determined (act 1520). This is achieved by determining a percentage of the sphere's area that was intersected by the HMD's field of view frustums during the pre-selected period of time. FIGS. 16 through 18 are provided to help with the understanding of this example method.

FIG. 16 shows an environment 1600 that includes a table 1605. In this scenario, the candidate hologram placement location 1610 was selected for consideration. As shown, this candidate hologram placement location 1610 is positioned slightly above the table 1605. According to the principles discussed in connection with FIG. 15, a virtual sphere 1615 is created around the candidate hologram placement location 1610, with the center of the virtual sphere 1615 being directly at the candidate hologram placement location 1610. It will be appreciated that the diameter of the virtual sphere 1615 may be set to any value. Example diameter values include, but are not limited to, 0.5 meters, 0.75 m, 1.0 m, 1.5 m, 2.0 m, 3.0 m, 4.0 m, 5.0 m, and so on. In some implementations, the diameter of the virtual sphere 1615 may be dependent on an anticipated size of a subsequent hologram that is anticipated to be placed at the candidate hologram placement location 1610. Once the virtual sphere 1615 is in place, then the HMD's field of view frustums can be monitored, as shown in FIG. 17. This placement location 1610 is compared to other placement locations 1610 (not called out) to obtain a comparative reference of visibility of the placement location 1610 relative to the other placement locations. This comparison can be used to determine the appropriate and corresponding ranking of the placement locations.

In FIG. 17, there is an environment 1700 which is an example implementation of the environment 1600 from FIG. 16. In this environment, a table 1705 is illustrated with a candidate hologram placement location 1710, a virtual sphere 1715 surrounding the candidate hologram placement location 1710, a HMD 1720, and the field of view 1725 of the HMD 1720. According to some embodiments, the frustums of the field of view 1725 are monitored for a period of time to determine whether that field of view 1725 overlaps the virtual sphere 1715. In the example scenario shown in FIG. 17, the field of view 1725 is overlapping the virtual sphere 1715 at the grayed location marked as overlap 1730. As indicated earlier, this monitoring process may continue for a pre-selected period of time to determine visibility of a placement location. When this analysis is done for multiple different locations, it is possible to determine a relative observability attribute for the different locations.

FIG. 18 illustrates another environment 1800, which is an example implementation of the environment 1700 from FIG. 17, but shown at a later point in time. It will also be appreciated that the methods illustrated in FIGS. 17 and 18 can also be used to calculate visibility, popularity, or combinations of visibility and popularity or some of the other factors/determinations as well. In this example, the HMD is moved to a different location, resulting in its field of view overlapping a different region of the virtual sphere. Notwithstanding its new location, all of the overlapping regions are recorded and monitored during this period of time. For instance, the overlap 1805 shows an area that was previously within the HMD's field of view but that is not currently in the field of view. In this regard, the embodiments are able to keep track of how much of the virtual sphere was viewed by the HMD's field of view. By aggregating the data about the overlap conditions, the embodiments are able to determine how visible the candidate hologram placement location is (e.g., based on a percentage of overlap for the sphere during the time period). The comparison of data obtained from different locations is used, in some embodiments, to generate the relative ranking of locations as being more or less suitable placement locations.

Accordingly, the disclosed embodiments are generally directed to systems and methods that rank a set of candidate hologram placement locations through the use of an established set of rules or criteria. By performing this ranking process, the embodiments are able to significantly improve a developer's ability in generating and placing holograms within a mixed-reality environment.

Example Computer System

Having just described the various features and functionalities of some of the disclosed embodiments, the focus will now be directed to FIG. 19 which illustrates an example computer system 1900 that may be used to facilitate the operations described herein. In particular, this computer system 1900 may be in the form of the HMDs that were described earlier. When in the form of a HMD, then the computer system may be an augmented-reality system or a virtual-reality system. In this manner, the HMD may be a wearable head-mounted computer system that includes a head mounted display for rendering content to the user.

Additionally, the computer system 1900 may take various different forms. For example, in FIG. 19, the computer system 1900 may be embodied as a tablet 1900A, a desktop 1900B, or a HMD 1900C. The ellipsis 1900D demonstrates that the computer system 1900 may be embodied in any form. For example, the computer system 1900 may also be a distributed system that includes one or more connected computing components/devices that are in communication with the computer system 1900, a laptop computer, a mobile phone, a server, a data center, and/or any other computer system.

In its most basic configuration, computer system 1900 includes various different components. For example, FIG. 19 shows that computer system 1900 includes at least one processor 1905 (aka a "hardware processing unit") and storage 1910. The storage 1910 is shown as including code 1915. The computer system 1900 may include a microelectromechanical (MEMs) mirror system or any other type of laser-based hologram projection unit. In some instances, the computer system 1900 may also (or alternatively) incorporate a liquid crystal on silicon (LCOS) display.

The storage 1910 may be physical system memory, which may be volatile, non-volatile, or some combination of the two. The term "memory" may also be used herein to refer to non-volatile mass storage such as physical storage media. If the computer system 1900 is distributed, the processing, memory, and/or storage capability may be distributed as well. As used herein, the term "executable module," "executable component," or even "component" can refer to software objects, routines, or methods that may be executed on the computer system 1900. The different components, modules, engines, and services described herein may be implemented as objects or processors that execute on the computer system 1900 (e.g. as separate threads).

The disclosed embodiments may comprise or utilize a special-purpose or general-purpose computer including computer hardware, such as, for example, one or more processors (such as processor 1905) and system memory (such as storage 1910), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 1900 may also be connected (via a wired or wireless connection) to external sensors (e.g., one or more remote cameras, accelerometers, gyroscopes, acoustic sensors, magnetometers, etc.). Further, the computer system 1900 may also be connected through one or more wired or wireless networks 1920 to remote systems(s) that are configured to perform any of the processing described with regard to computer system 1900.

During use, a user of the computer system 1900 is able to perceive information (e.g., a mixed-reality environment) through a display screen that is included among any input/output (I/O) interface(s) and that is visible to the user. I/O interface(s) and sensors also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in a mixed-reality environment/scene.

A graphics rendering engine may also be configured, with the processor 1905, to render one or more virtual objects within a mixed-reality scene/environment. As a result, the virtual objects accurately move in response to a movement of the user and/or in response to user input as the user interacts within the virtual scene.

A "network," like the network 1920 shown in FIG. 19, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 1900 will include one or more communication channels that are used to communicate with the network 1920. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1905). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are executable by the one or more processors to cause the computer system to:

access a spatial mapping of an environment, wherein the spatial mapping includes information describing the environment in a three-dimensional (3D) representation;

based on an analysis of the spatial mapping, generate an unordered set of one or more candidate hologram placement locations that are identified from within the environment, wherein:

each one of the one or more candidate hologram placement locations identifies a corresponding physical location in the environment, and each one of the one or more candidate hologram placement locations is selected for inclusion in the unordered set as a result of each one satisfying certain minimum criteria that are used to determine whether each corresponding physical location is suitable for hosting one or more holograms;

rank each one of the one or more candidate hologram placement locations in the unordered set so as to generate a set of ranked candidate hologram placement locations, wherein the ranking is based on a set of pre-defined hologram placement criteria; and expose the set of ranked candidate hologram placement locations by causing the set of ranked candidate hologram placement locations to be accessible during a hologram placement event.

2. The computer system of claim 1, wherein the information that describes the environment in the 3D representation and that is included in the spatial mapping includes planar information for one or more geometric planes in the environment.

3. The computer system of claim 1, wherein the information that describes the environment in the 3D representation and that is included in the spatial mapping includes volumetric information for one or more cubic areas in the environment.

4. The computer system of claim 1, wherein the set of pre-defined hologram placement criteria that is used when the set of ranked candidate hologram placement locations is generated includes a flatness determination for a planar surface in the environment.

5. The computer system of claim 1, wherein the set of pre-defined hologram placement criteria that is used when the set of ranked candidate hologram placement locations is generated includes a visibility determination.

6. The computer system of claim 5, wherein, for each corresponding physical location corresponding to the one or more candidate hologram placement locations, a corresponding visibility determination for each corresponding physical location is based on a quality and/or quantity of distinct vantage points that are determined to be associated with each corresponding physical location.

7. The computer system of claim 1, wherein the set of pre-defined hologram placement criteria that is used when the set of ranked candidate hologram placement locations is generated includes an observability determination.

8. The computer system of claim 1, wherein the set of pre-defined hologram placement criteria that is used when the set of ranked candidate hologram placement locations is generated includes a stability determination.

9. The computer system of claim 1, wherein the set of pre-defined hologram placement criteria that is used when the set of ranked candidate hologram placement locations is generated includes an age determination.

10. The computer system of claim 1, wherein the set of pre-defined hologram placement criteria that is used when the set of ranked candidate hologram placement locations is generated includes a popularity determination.

11. The computer system of claim 1, wherein the set of pre-defined hologram placement criteria that is used when the set of ranked candidate hologram placement locations is generated includes a reachability determination.

12. A method that is implemented by a computer system and that comprises:

accessing a spatial mapping of an environment, wherein the spatial mapping includes information describing the environment in a three-dimensional (3D) representation;

based on an analysis of the spatial mapping, generating an unordered set of one or more candidate hologram placement locations that are identified from within the environment, wherein:

each one of the one or more candidate hologram placement locations identifies a corresponding physical location in the environment, and each one of the one or more candidate hologram placement locations is selected for inclusion in the unordered set as a result of each one satisfying certain minimum criteria that are used to determine whether each one's corresponding physical location is suitable for hosting one or more holograms;

ranking each one of the one or more candidate hologram placement locations in the unordered set so as to generate a set of ranked candidate hologram placement locations, wherein the ranking is based on a set of pre-defined hologram placement criteria; and exposing the set of ranked candidate hologram placement locations by causing the set of ranked candidate hologram placement locations to be accessible during a hologram placement event.

13. The method of claim 12, wherein the set of pre-defined hologram placement criteria that is used when the set of ranked candidate hologram placement locations is generated includes a flatness determination, a visibility determination, an observability determination, a stability determination, an age determination, a popularity determination, and a reachability determination.

14. The method of claim 12, wherein the spatial mapping of the environment includes a three-dimensional (3D) mesh of the environment.

15. The method of claim 12, wherein the certain minimum criteria that are used to determine whether each one's corresponding physical location is suitable for hosting one or more holograms includes a transience criteria.

16. The method of claim 15, wherein, at least during some time periods, an object that is identified as being a transient object and that is located within the environment is determined to have transient attributes that surpass a particular threshold such that the transient object fails to satisfy the transience criteria and such that the transient object is not determined to be suitable for hosting the one or more holograms.

17. The method of claim 12, wherein the set of ranked candidate hologram placement locations is hardware platform agnostic.

18. The method of claim 12, wherein the spatial mapping of the environment is stored in a cloud environment, or, alternatively, the spatial mapping is generated by the computer system scanning the environment and storing the spatial mapping on the computer system such that the spatial mapping is accessed locally.

19. A wearable head-mounted computer system comprising:

a head mounted display;

one or more processors; and one or more computer-readable hardware storage devices having stored thereon computer-executable instructions that are executable by the one or more processors to cause the wearable head-mounted computer system to:

access a spatial mapping of an environment, wherein the spatial mapping includes information describing the environment in a three-dimensional (3D) representation;

based on an analysis of the spatial mapping, generate an unordered set of one or more candidate hologram placement locations that are identified from within the environment, wherein:

each one of the one or more candidate hologram placement locations identifies a corresponding physical location in the environment, and each one of the one or more candidate hologram placement locations is selected for inclusion in the unordered set as a result of each one satisfying certain minimum criteria that are used to determine whether each one's corresponding physical location is suitable for hosting one or more holograms;

rank each one of the one or more candidate hologram placement locations in the unordered set so as to generate a set of ranked candidate hologram placement locations, wherein the ranking is based on a set of pre-defined hologram placement criteria; and expose the set of ranked candidate hologram placement locations by causing the set of ranked candidate hologram placement locations to be accessible during a hologram placement event.

20. The wearable head-mounted computer system of claim 19, wherein the set of pre-defined hologram placement criteria that is used when the set of ranked candidate hologram placement locations is generated includes any one or combination of the following: a flatness determination, a visibility determination, an observability determination, a stability determination, an age determination, a popularity determination, and a reachability determination.

* * * * *